United States Patent
Li et al.

(10) Patent No.: US 11,792,847 B2
(45) Date of Patent: *Oct. 17, 2023

(54) METHOD FOR LISTENING ON UPLINK CHANNEL AND APPARATUS

(71) Applicant: HUAWEI TECHNOLOGIES CO., LTD., Guangdong (CN)

(72) Inventors: Yuan Li, Beijing (CN); Lei Guan, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/741,114

(22) Filed: May 10, 2022

(65) Prior Publication Data
US 2022/0272751 A1 Aug. 25, 2022

Related U.S. Application Data

(63) Continuation of application No. 16/828,332, filed on Mar. 24, 2020, now Pat. No. 11,357,043, which is a
(Continued)

(51) Int. Cl.
*H04W 74/08* (2009.01)
*H04W 72/04* (2023.01)
(Continued)

(52) U.S. Cl.
CPC ........... *H04W 74/08* (2013.01); *H04L 1/1812* (2013.01); *H04W 72/0453* (2013.01)

(58) Field of Classification Search
CPC ... H04W 28/04; H04W 72/04; H04W 72/042; H04W 88/08; H04W 74/08;
(Continued)

(56) References Cited

U.S. PATENT DOCUMENTS

| 2015/0271847 A1 | 9/2015 | Luo et al. |
| 2016/0127098 A1 | 5/2016 | Ng et al. |

(Continued)

FOREIGN PATENT DOCUMENTS

| CN | 104052745 | 9/2014 |
| CN | 105306176 | 2/2016 |

(Continued)

OTHER PUBLICATIONS

3GPP TSG RAN WG1 Meeting #90, Prague, Czechia, Aug. 21-25, 2017, R1-1713524, Agenda item: 5.2.3.3.3, Source: Samsung, Title: Channel Access for Autonomous UL access. (Year: 2017).*

(Continued)

*Primary Examiner* — Peter G Solinsky
*Assistant Examiner* — Sanjay K Dewan
(74) *Attorney, Agent, or Firm* — Fish & Richardson P.C.

(57) ABSTRACT

Example communication methods and apparatus are described. One example method includes performing first listen before talk (LBT) and sending a first data packet on a first uplink burst after the first LBT succeeds. A second contention window size is determined based on the first contention window size and a first reference time unit. Second LBT is performed based on the second contention window size. The first contention window size is used for a LBT previous to the second LBT, the first reference time unit is later than the second reference time unit corresponding to the first uplink burst. The first reference time unit is a time unit for determining the second contention window size, or a starting time unit of a second uplink burst corresponding to the second LBT. The second reference time unit corresponding to the first uplink burst is a time unit in the first uplink burst.

20 Claims, 5 Drawing Sheets

Related U.S. Application Data continuation of application No. PCT/CN2017/103176, filed on Sep. 25, 2017.

(51) Int. Cl.
*H04L 1/18* (2023.01)
*H04L 1/1812* (2023.01)
*H04W 72/0453* (2023.01)

(58) Field of Classification Search
CPC ............ H04W 72/0453; H04W 72/11; H04W 72/115; H04W 72/40; H04W 72/23; H04L 5/0007; H04L 1/1812
USPC .......................................................... 370/329
See application file for complete search history.

(56) References Cited

U.S. PATENT DOCUMENTS

| | | | |
|---|---|---|---|
| 2018/0027554 A1 | 1/2018 | Yerramalli et al. | |
| 2019/0150170 A1 | 5/2019 | Park et al. | |
| 2019/0159256 A1* | 5/2019 | Talarico | H04L 1/187 |
| 2021/0014891 A1* | 1/2021 | Talarico | H04W 16/14 |
| 2022/0141065 A1* | 5/2022 | Mondal | H04L 5/005 |
| | | | 370/329 |
| 2022/0174741 A1* | 6/2022 | Myung | H04W 72/0453 |

FOREIGN PATENT DOCUMENTS

| | | | |
|---|---|---|---|
| CN | 106559909 | 4/2017 | |
| CN | 106656428 | 5/2017 | |
| JP | 2018523333 | 8/2018 | |
| RU | 2580794 | 4/2016 | |
| WO | 2016072916 | 5/2016 | |
| WO | 2016182355 | 11/2016 | |
| WO | 2017050055 | 3/2017 | |
| WO | 2017131476 | 8/2017 | |
| WO | WO 2017/184071 A2 * | 10/2017 | ............ H04W 74/02 |
| WO | WO 2018/029654 A1 * | 2/2018 | ............ H04W 74/08 |
| WO | 2018523333 | 8/2018 | |
| WO | WO 2018/171927 A1 * | 9/2018 | ............ H04W 72/04 |
| WO | WO 2020/186166 A1 * | 9/2020 | ............... H04L 1/18 |
| WO | WO 2020/205728 A1 * | 10/2020 | ............... H04L 1/18 |

OTHER PUBLICATIONS

3GPP TSG RAN WG1 Meeting #82bis. Malmo, Sweden, Oct. 5-9, 2015, R1-156034, Source: Ericsson, Title: On CWS adjustment based on HARQ-ACK feedback, Agenda item: 7.2.3.1. (Year: 2015).*
3GPP TSG RAN WG1 Meeting #82bis, Malmo, Sweden, Oct. 5-9, 2015, R1-155846, Agenda item: 7.2.3.1, Source: Intel Corporation, Title: Evaluation Results on HARQ ACK/NACK CW Adaptation. (Year: 2015).*
3GPP TSG-RAN WG1 Meeting #90, Prague, Czech Republic, Aug. 21-25, 2017, R1-1713861, Agenda item: 5.2.3.3.3, Source: Nokia, Nokia Shanghai Bell, Title: On channel access for (Year: 2017).*
Huawei, HiSilicon, "On channel access for AUL [online]," 3GPP TSG RAN WG1 #90b, R1-1717117, Prague, Czech Republic, Oct. 9-13, 2017, 5 pages.
Intel Corporation, "Evaluation Results on HARQ ACK/NACK CW Adaptation," 3GPP TSG RAN WG1 Meeting #82bis, R1-155846, Malmo, Sweden, Oct. 5-9, 2015, 14 pages.
Nokia, Nokia Shanghai Bell, "On channel access for autonomous UL access," 3GPP TSG-RAN WG1 Meeting #90, R1-1713861, Prague, Czech Republic, Aug. 21-25, 2017, 6 pages.
Office Action in Chinese Application No. 201780095217.7 dated May 25, 2021, 19 pages (with English translation).
Office Action issued in Japanese Application No. 2020-517195 dated Apr. 20, 2021, 7 pages (with English translation).
Office Action issued in Russian Application No. 2020114612/07(024278) dated Oct. 26, 2020, 8 pages.
PCT International Search Report and Written Opinion issued in International Application No. PCT/CN2017/103176 dated Dec. 19, 2017, 20 pages (with English translation).
Samsung, "Channel access for autonomous UL access," 3GPP TSG RAN WG1 Meeting #90, R1-1713524, Prague, Czechia, Aug. 21-25, 2017, 4 pages.
Samsung, "Remaining details of HARQ-ACK based CWS adaptation," 3GPP TSG RAN WG1 Meeting #83, R1-156761, Anaheim, USA, Nov. 15-22, 2015, 6 pages.

* cited by examiner

METHOD FOR LISTENING ON UPLINK CHANNEL AND APPARATUS

CROSS-REFERENCE TO RELATED APPLICATIONS

This application is a continuation of U.S. patent application Ser. No. 16/828,332, filed on Mar. 24, 2020, which is a continuation of International Application No. PCT/CN2017/103176, filed on Sep. 25, 2017. All of the afore-mentioned patent applications are hereby incorporated by reference in their entireties.

TECHNICAL FIELD

This application relates to the communications field, and in particular, to a method for listening on an uplink channel and an apparatus in the communications field.

BACKGROUND

A licensed-assisted access using long term evolution (licensed-assisted access using Long Term Evolution, LAA-LTE) technology (that is, an LAA technology) is introduced into Release 13 in the fourth generation (4G) mobile communications technology, and an enhanced licensed-assisted access (enhanced licensed-assisted access, eLAA) technology is introduced into Release 14. In the LAA technology and the eLAA technology, an available spectrum may be extended to a 5 GHz unlicensed band by using a carrier aggregation (carrier aggregation, CA) technology. With assistance of a licensed spectrum, a network device and a terminal device may transmit downlink information and uplink information on an unlicensed spectrum. Based on the LAA and eLAA, the Multefire 1.0 standard further implements uplink and downlink transmission in an LTE system completely on an unlicensed spectrum without relying on assistance of a licensed spectrum. In a future fifth generation new radio (fifth generation New Radio, 5G NR) system, transmission on an unlicensed spectrum also exists.

To implement fair coexistence with network devices and terminal devices of different operators and inter-RAT such as Wi-Fi radio nodes on an unlicensed spectrum, the LAA, the eLAA, and a Multefire system use a listen-before-talk (listen before talk, LBT) channel access mechanism, in which listening on a channel is required before a network device performs downlink transmission or a terminal device performs uplink transmission. A listening manner includes clear channel assessment (clear channel assessment, CCA) of random backoff, and a value of an initial random backoff counter of the CCA is determined by a contention window size (contention window size, CWS). For scheduling-based uplink transmission, the terminal device dynamically adjusts the CWS based on hybrid automatic repeat request (hybrid automatic repeat request, HARQ) status information fed back by the network device, to adapt to a channel status and fairly coexist with a contention node.

In a further enhanced licensed-assisted access (Further enhanced licensed-assisted access, FeLAA) system and a Multefire 1.1 system that are introduced into Release 15, a grant-free uplink (Grant-free Uplink or Grantless Uplink, GUL) transmission mechanism, or referred to as an autonomous uplink (Autonomous UL, AUL) transmission mechanism, is introduced. The terminal device does not need to send a scheduling request (scheduling request, SR) and wait for an uplink grant (UL grant). Instead, the terminal device may directly send uplink data on an AUL resource after LBT succeeds, thereby eliminating channel listening for the SR and the UL grant. For the grant-free uplink transmission, after the terminal device sends the AUL transmission, the network device may not correctly receive the AUL transmission of the terminal device and does not identify the corresponding terminal device. Consequently, the terminal device cannot receive any HARQ status information. An uplink CWS adjustment criterion in the prior art is not applicable to the scenario in which the terminal device cannot receive the HARQ status information in AUL transmission, and cannot resolve a channel adaptation problem of the terminal device in AUL transmission.

SUMMARY

Embodiments of the present invention provide a method for listening on an uplink channel and an apparatus, to provide an uplink CWS adjustment method.

According to a first aspect, an embodiment of the present invention provides a method for listening on an uplink channel. In the method, the terminal device performs first listen before talk LBT, and sends a first data packet on a first uplink burst after the first LBT succeeds. The terminal device determines a second contention window size CWS, and performs second LBT based on the second CWS.

In a first manner, on condition that a first time length is greater than or equal to a first time threshold, and the terminal device does not receive first indication information indicating an HARQ status after the first uplink burst, the second CWS is greater than a first CWS. For example, the second CWS may be 7, and the first CWS may be 3.

In a second manner, on condition that a first time length is less than or equal to the first time threshold, and the terminal device does not receive the first indication information indicating the HARQ status after the first uplink burst, the second CWS is equal to the first CWS.

In a third manner, on condition that the first time length is less than or equal to the first time threshold, and the terminal device does not receive the first indication information indicating the HARQ status after the first uplink burst, the second CWS is determined based on second indication information, where the second indication information is indication information that is received by the terminal device before the first uplink burst and that is used to indicate the HARQ status.

An interval between a first reference time unit and a second reference time unit that corresponds to the first uplink burst is a first time length, the first CWS is a CWS corresponding to LBT previous to the second LBT, and the first reference time unit is later than the second reference time unit.

According to a second aspect, an embodiment of the present invention provides a wireless apparatus. The apparatus includes a processor, and a memory and a transceiver that are coupled to the processor.

The processor is configured to perform first listen before talk LBT; the transceiver is configured to send a first data packet on a first uplink burst after the first LBT succeeds; and the processor is further configured to determine a second contention window size CWS.

In a first manner, on condition that a first time length is greater than or equal to a first time threshold, and the wireless apparatus does not receive first indication information indicating an HARQ status after the first uplink burst, the second CWS is greater than a first CWS.

In a second manner, on condition that a first time length is less than or equal to the first time threshold, and the wireless apparatus does not receive the first indication information indicating the HARQ status after the first uplink burst, the second CWS is equal to the first CWS.

In a third manner, on condition that the first time length is less than or equal to the first time threshold, and the wireless apparatus does not receive the first indication information indicating the HARQ status after the first uplink burst, the second CWS is determined based on second indication information, where the second indication information is indication information that is received before the first uplink burst and that is used to indicate the HARQ status.

The processor is further configured to perform second LBT based on the second CWS.

An interval between a first reference time unit and a second reference time unit that corresponds to the first uplink burst is a first time length, the first CWS is a CWS corresponding to LBT previous to the second LBT, and the first reference time unit is later than the second reference time unit.

It should be noted that the foregoing three manners may be used as independent solutions, or any two of the foregoing three manners are used as an overall solution, or the three solutions may be used as an overall solution. For example, the first manner is independently used. In another case, another manner may be used, and is not limited to the method provided in this embodiment of the present invention. Alternatively, the second manner is independently used. In another case, another manner may be used, and is not limited to the method provided in this embodiment of the present invention. In addition, in the embodiments of the present invention, all parallel manners are similar to this case, and details are not described below again.

Optionally, the terminal device sends a second data packet on a second uplink burst on condition that the second LBT succeeds, where the second uplink burst is later than the first uplink burst.

Optionally, that the terminal device does not receive the first indication information indicating the HARQ status after the first uplink burst may be that the terminal device does not receive the first indication information indicating the HARQ status after the first uplink burst and before the second uplink burst, or may be that the terminal device does not receive, after the second reference time unit corresponding to the first uplink burst and before the first reference time unit, the first indication information indicating the HARQ status, or may be that the terminal device does not receive, within a first time threshold starting from the second reference time unit corresponding to the first uplink burst, the first indication information indicating the HARQ status.

The first uplink burst and the second uplink burst are bursts of autonomous uplink (Autonomous UL, AUL) transmission. It should be understood that this description is applicable to all uplink bursts in the embodiments of the present invention. The LBT previous to the second LBT is a previous LBT based on random backoff CCA. It should be understood that this description is also applicable to all LBT in the embodiments of the present invention.

In the foregoing embodiment, a CWS is determined with reference to a time threshold, for example, a timer. After sending an uplink burst (referred to as the first uplink burst), if the terminal device does not receive the indication information (referred to as the first indication information) carrying the HARQ status, for example, the terminal device does not receive the first indication information between the first uplink burst and the second uplink burst, and the first reference time unit exceeds the first time threshold corresponding to the first uplink burst, to be specific, duration of a timer corresponding to the first uplink burst, the terminal device performs channel listening after increasing the CWS corresponding to the second uplink burst. The time threshold, for example, the timer, is set, so that the CWS is increased when the first reference time unit exceeds the timer and no HARQ status information is received, thereby avoiding that because there is a delay in feeding back the HARQ status information, the CWS is increased when HARQ status information fed back by a network device is not received within a time interval (for example, a time interval less than the delay) after one uplink burst. Therefore, it is avoided that a success rate of accessing a channel by the terminal device is reduced due to an excessive increase of the CWS, so that the terminal device can more properly adapt to a channel status when performing AUL uplink transmission.

According to a third aspect, an embodiment of the present invention provides a method for listening on an uplink channel. In the method, the terminal device sends a first data packet on a first uplink burst. The terminal device performs first LBT, and sends a second data packet on a second uplink burst after the first LBT succeeds. The second uplink burst is later than the first uplink burst. The terminal device determines a second contention window size CWS, and performs second LBT based on the second CWS. The terminal device sends a third data packet on a third uplink burst on condition that the second LBT succeeds, where the third uplink burst is later than the second uplink burst. An interval between a first reference time unit and a second reference time unit that corresponds to the first uplink burst is a first time length, and an interval between the first reference time unit and a second reference time unit that corresponds to the second uplink burst is a second time length. On condition that the second time length is greater than or equal to a first time threshold, and the first time length is greater than or equal to the first time threshold, and the terminal device does not receive first indication information indicating an HARQ status after the first uplink burst, the second CWS is a CWS increased on a basis of a first CWS, and the first CWS is a CWS corresponding to LBT previous to the first LBT.

According to a fourth aspect, an embodiment of the present invention provides a wireless apparatus. The apparatus includes a processor, and a memory and a transceiver that are coupled to the processor.

The transceiver is configured to send a first data packet on a first uplink burst. The processor is further configured to perform first LBT. The transceiver is further configured to send a second data packet on a second uplink burst after the first LBT succeeds, where the second uplink burst is later than the first uplink burst. The processor is further configured to: determine a second contention window size CWS, and perform second LBT based on the second CWS.

An interval between a first reference time unit and a second reference time unit that corresponds to the first uplink burst is a first time length, and an interval between the first reference time unit and a second reference time unit that corresponds to the second uplink burst is a second time length. On condition that the second time length is greater than or equal to a first time threshold, and the first time length is greater than or equal to the first time threshold, and the terminal device does not receive first indication information indicating an HARQ status after the first uplink burst, the second CWS is a CWS increased on a basis of a first CWS, and the first CWS is a CWS corresponding to LBT previous to the first LBT.

The processor is further configured to control the terminal device send a third data packet on a third uplink burst on condition that the second LBT succeeds, where the third uplink burst is later than the second uplink burst.

In the third aspect and the fourth aspect, the first reference time unit exceeds the first time threshold corresponding to the first uplink burst, that is, duration of a timer corresponding to the first uplink burst, and the first reference time unit also exceeds duration of a timer corresponding to the second uplink burst. In addition, on condition that no HARQ status information is received after the first uplink burst, in other words, when the terminal device exceeds timers corresponding to a plurality of uplink bursts and does not receive the HARQ status information, the terminal device increases the CWS only once, thereby avoiding excessive penalty on the CWS when there are a plurality of times of expiration, and improving properness of adjusting the CWS by the terminal device in an AUL scenario.

Optionally, the second CWS may be determined based on the second indication information. When the second indication information is an ACK or a UL grant whose NDI is in a toggled state, the second CWS is less than the first CWS. When the second indication information is a NACK or a UL grant whose NDI is in a non-toggled state, the second CWS is greater than the first CWS.

Optionally, the second reference time unit corresponding to the first uplink burst is a time unit in the first uplink burst.

Optionally, the second reference time unit corresponding to the first uplink burst is a time unit that has an interval of a third time length from a start time unit of the first uplink burst, and the second reference time unit is after the start time unit of the first uplink burst. Further, the second reference time unit corresponding to the first uplink burst may be the start time unit of the first uplink burst.

Optionally, the first CWS and the second CWS correspond to a same access priority.

According to a fifth aspect, an embodiment of the present invention provides a method for listening on an uplink channel by a terminal device. In the method, the terminal device sends a first data packet on a first uplink burst. The terminal device performs first LBT, and sends a second data packet on a second uplink burst after the first LBT succeeds, where the second uplink burst is later than the first uplink burst. The terminal device determines a second contention window size CWS, and performs second LBT based on the second CWS. An interval between a first reference time unit and a second reference time unit that corresponds to the first uplink burst is a first time length, and an interval between the first reference time unit and a second reference time unit that corresponds to the second uplink burst is a second time length. The terminal device sends a third data packet on a third uplink burst on condition that the second LBT succeeds, where the third uplink burst is later than the second uplink burst.

In a first manner, on condition that the second time length is less than a first time threshold, and the first time length is greater than or equal to the first time threshold, and the terminal device does not receive first indication information indicating an HARQ status after the first uplink burst, and further on condition that a first CWS corresponding to the first LBT is not increased compared with a third CWS, the second CWS is greater than a fourth CWS, where the fourth CWS is a CWS corresponding to LBT previous to the second LBT, and the third CWS is a CWS corresponding to LBT previous to the first LBT.

In a second manner, on condition that the second time length is less than a first time threshold, and the first time length is greater than or equal to the first time threshold, and the terminal device does not receive first indication information indicating an HARQ status after the first uplink burst, and further on condition that a first CWS corresponding to the first LBT is increased compared with the third CWS, the second CWS is equal to the fourth CWS, where the fourth CWS is a CWS corresponding to LBT previous to the second LBT, and the third CWS is a CWS corresponding to LBT previous to the first LBT.

According to a sixth aspect, an embodiment of the present invention provides a wireless apparatus. The apparatus includes a processor, and a memory and a transceiver that are coupled to the processor.

The transceiver is configured to send a first data packet on a first uplink burst. The processor is configured to perform first LBT. The transceiver is further configured to send a second data packet on a second uplink burst after the first LBT succeeds, where the second uplink burst is later than the first uplink burst. The processor is further configured to: determine a second contention window size CWS, and perform second LBT based on the second CWS. An interval between a first reference time unit and a second reference time unit that corresponds to the first uplink burst is a first time length, and an interval between the first reference time unit and a second reference time unit that corresponds to the second uplink burst is a second time length.

In a first manner, on condition that the second time length is less than a first time threshold, and the first time length is greater than or equal to the first time threshold, and the wireless apparatus does not receive first indication information indicating an HARQ status after the first uplink burst, and further on condition that a first CWS corresponding to the first LBT is not increased compared with a third CWS, the second CWS is greater than a fourth CWS, where the fourth CWS is a CWS corresponding to LBT previous to the second LBT, and the third CWS is a CWS corresponding to LBT previous to the first LBT.

In a second manner, on condition that the second time length is less than a first time threshold, and the first time length is greater than or equal to the first time threshold, and the wireless apparatus does not receive first indication information indicating an HARQ status after the first uplink burst, and further on condition that a first CWS corresponding to the first LBT is increased compared with the third CWS, the second CWS is equal to the fourth CWS, where the fourth CWS is a CWS corresponding to LBT previous to the second LBT, and the third CWS is a CWS corresponding to LBT previous to the first LBT; and the transceiver is further configured to send a third data packet on a third uplink burst on condition that the second LBT succeeds, where the third uplink burst is later than the second uplink burst.

In the foregoing embodiment, on condition that the third uplink burst exceeds a timer corresponding to the first uplink burst, in other words, the first time length is greater than or equal to the first time threshold, when there is the second uplink burst between the first uplink burst and the third uplink burst, on condition that the first CWS corresponding to the first LBT is increased compared with the third CWS, the third CWS is a CWS corresponding to LBT previous to the first LBT, in other words, a CWS corresponding to the second uplink burst is a CWS that has been increased compared with the CWS corresponding to the previous LBT. In addition, if the third uplink burst does not exceed the timer corresponding to the second uplink burst, in other words, the second time length is less than the first time threshold, the terminal device does not increase the second CWS, that is, the second CWS is equal to the fourth CWS. Optionally, the terminal device restarts a new timer for the second uplink burst on which the CWS has been adjusted, and determines, based on a receiving status of an HARQ status and the time interval between the second uplink burst and the third uplink burst, the CWS corresponding to the third uplink burst.

According to the method provided in this embodiment, on condition that the HARQ status information is not received after the first uplink burst, the terminal device has increased the CWS corresponding to the second uplink burst between the first uplink burst and the third uplink burst, and the first reference time unit does not exceed timer duration of the second uplink burst, the terminal device does not increase, because the third uplink burst exceeds timer duration corresponding to the first uplink burst, the CWS corresponding to the third uplink burst, but keeps the CWS corresponding to the third uplink burst unchanged. Compared with the method in which the terminal device increases the CWS provided that the first reference time unit exceeds the timer duration, this embodiment improves properness of adjusting the CWS by the terminal device in the AUL scenario.

It should be noted that the first manner and the second manner herein may be used as an overall solution, or may be used as independent solutions.

Optionally, the second reference time unit corresponding to the first uplink burst is a time unit in the first uplink burst; or the second reference time unit corresponding to the first uplink burst is a time unit that has an interval of a third time length from a start time unit of the first uplink burst, and the second reference time unit is after the start time unit of the first uplink burst; and the second reference time unit corresponding to the second uplink burst is a time unit in the second uplink burst; or the second reference time unit corresponding to the second uplink burst is a time unit that has an interval of a third time length from a start time unit of the second uplink burst, and the second reference time unit is after the start time unit of the first uplink burst.

Further, the second reference time unit corresponding to the first uplink burst may be different from the second reference time unit corresponding to the second uplink burst.

Optionally, the second reference time unit corresponding to the first uplink burst is the start time unit of the first uplink burst; or the second reference time unit corresponding to the second uplink burst is the start time unit of the second uplink burst.

Optionally, the second CWS and the third CWS correspond to a same access priority, and the first CWS and the fourth CWS correspond to a same access priority.

Optionally, in the foregoing aspects, the first reference time unit is a time unit in which the terminal device determines the second CWS.

Further, embodiments of the foregoing aspects may further include: sending a second data packet on a second uplink burst on condition that the second LBT succeeds, where the second uplink burst is later than the first uplink burst.

Optionally, the first reference time unit is a start time unit of the second uplink burst.

Optionally, the LBT previous to the second LBT is the same as the first LBT.

Further, the second time length may be predefined or received from a network device.

Optionally, the third time length may be related to a delay of feeding back an HARQ status by the network device.

Optionally, the second CWS and the first CWS correspond to a same access priority.

Optionally, the determining, by the terminal device, a second CWS further includes: on condition that the first time length is greater than or equal to the first time threshold, and the terminal device does not receive, within a time after the first uplink burst and before the second uplink burst, the first indication information indicating the HARQ status, and the second uplink burst is an uplink burst immediately after a third reference time unit corresponding to the first uplink burst, the second CWS is greater than the first CWS, the first CWS is a CWS corresponding to LBT previous to the second LBT, the third reference time unit corresponding to the first uplink burst is later than the second reference time unit corresponding to the first uplink burst, and a time interval between the third reference time unit corresponding to the first uplink burst and the second reference time unit corresponding to the first uplink burst is the first time threshold.

Optionally, in this embodiment of the present invention, that the second CWS is greater than the first CWS may mean that in a CWS set, the second CWS is a next-level CWS of the first CWS, that is, a smallest CWS that is greater than the first CWS and that is in the CWS set.

For example, CWS values available for the terminal device form a CWS set. When increasing a CWS, the terminal device increases the CWS to a next higher value in the CWS set. For example, the CWS set may be {3, 7}, {7, 15}, or {15, 31, 63, 127, 255, 511, 1023}.

Optionally, when decreasing the CWS, the terminal device decreases the CWS to a smallest value in the CWS set.

According to a seventh aspect, a communications apparatus is provided. The communications apparatus is configured to perform functions of behaviors of the terminal device in the foregoing method in actuality. These functions may be implemented by hardware, or may be implemented by hardware executing corresponding software. The hardware or the software includes one or more units corresponding to the functions.

According to an eighth aspect, a computer storage medium including an instruction is provided. When the instruction is run on a computer, the computer is enabled to perform functions of behaviors of the terminal device in the foregoing method in actuality.

DESCRIPTION OF EMBODIMENTS

The following describes technical solutions in embodiments of the present invention with reference to the accompanying drawings.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should be understood that the present invention is applicable to a wireless cellular communications network system using an unlicensed spectrum for communication, for example, a licensed assisted access (Licensed assisted access, LAA) system of long term evolution (Long Term Evolution, LTE), an enhanced licensed assisted access (Enhanced Licensed Assisted Access, eLAA) system, a further enhanced licensed assisted access (Further Enhanced Licensed Assisted Access, FeLAA) system, a communications system using an unlicensed spectrum in a 5G communications system, and a MulteFire system independently working in an unlicensed spectrum, and a communications system using an unlicensed spectrum in a future mobile communications network.

Figure 1:
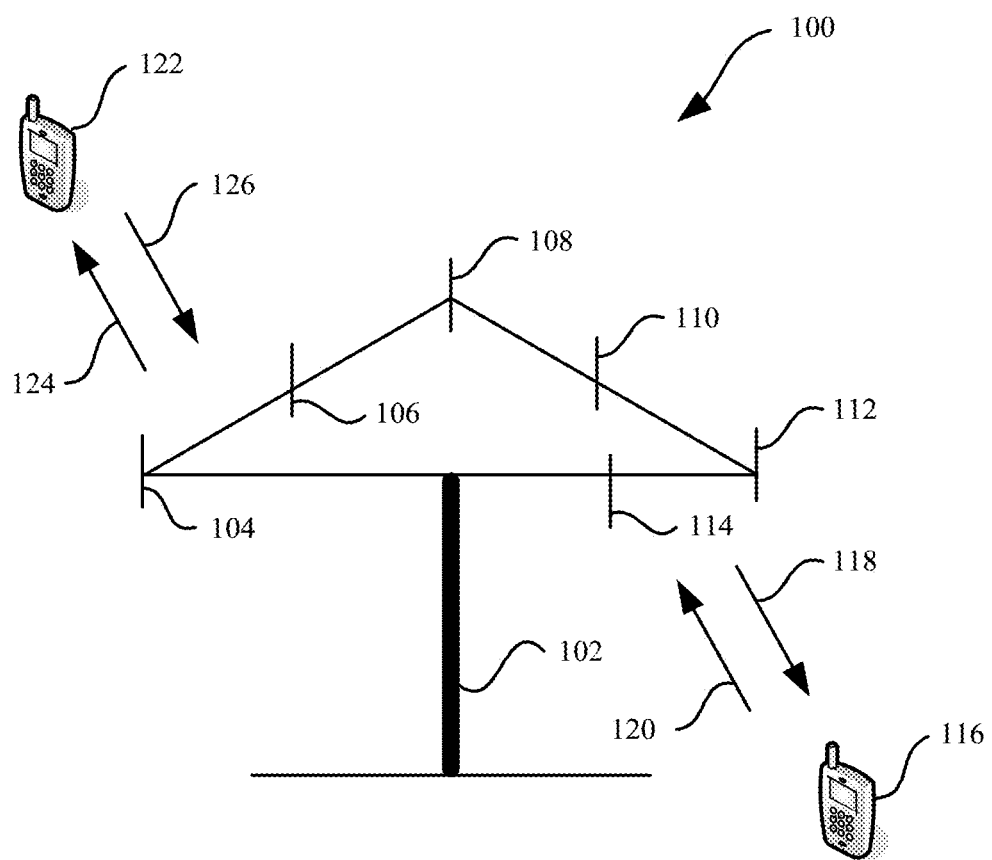
FIG. 1 is a schematic diagram of a communications system to which an embodiment of the present invention applies.

FIG. 1 is a schematic diagram of a communications system according to an embodiment of the present invention. As shown in FIG. 1, the communications system 100 includes a network device 102. The network device 102 may include a plurality of antennas, for example, antennas 104, 106, 108, 110, 112, and 114. In addition, the network device 102 may additionally include a transmitter chain and a receiver chain. A person of ordinary skill in the art may understand that both the transmitter chain and the receiver chain may include a plurality of components (for example, a processor, a modulator, a multiplexer, a demodulator, a demultiplexer, or an antenna) related to signal sending and receiving. The network device 102 may communicate with a plurality of terminal devices (such as a terminal device 116 and a terminal device 122). However, it may be understood that the network device 102 may communicate with any quantity of terminal devices that are similar to the terminal device 116 or 122.

As shown in FIG. 1, the terminal device 116 communicates with the network device 102. The network device 102 sends information to the terminal device 116 over a downlink 118, and receives information from the terminal device 116 over an uplink 120. In addition, the terminal device 122 communicates with the network device 102. The network device 102 sends information to the terminal device 122 over a downlink 124, and receives information from the terminal device 122 over an uplink 126.

For example, on an unlicensed frequency band, the downlink 118 and the uplink 120 may use a same frequency band, and the downlink 124 and the uplink 126 may use a same frequency band.

In addition, the communications system 100 may be a public land mobile network (Public Land Mobile Network, PLMN), a D2D network, an M2M network, or another network. FIG. 1 is only an example of a simplified schematic diagram. The network may further include another network device not shown in FIG. 1.

The embodiments of the present invention describe the embodiments with reference to a terminal device. The terminal device may also be referred to as user equipment (User Equipment, UE), a mobile station (Mobile Station, MS), a mobile terminal (Mobile Terminal), or the like. The terminal device may communicate with one or more core networks by using a radio access network (Radio Access Network, RAN). For example, the terminal device is a device that has a wireless transceiver function, may be deployed on land, including being deployed indoor or outdoor, and may be handheld or vehicle-mounted; may be deployed on water (such as ships); or may be deployed in the air (such as airplanes, balloons, and satellites). The terminal device may be a mobile phone (mobile phone), a tablet computer (Pad), a computer with a wireless transceiver function, a virtual reality (Virtual Reality, VR) terminal device, an augmented reality (Augmented Reality, AR) terminal device, a wireless terminal in industrial control (industrial control), a wireless terminal in self driving (self driving), a wireless terminal in remote medical (remote medical), a wireless terminal in smart grid (smart grid), a wireless terminal in transportation safety (transportation safety), a wireless terminal in a smart city (smart city), a wireless terminal in a smart home (smart home), or the like.

In addition, a network device (for example, the network device 201) in this embodiment of the present invention is an apparatus that is deployed in a radio access network and that is configured to provide a wireless communication function for a terminal device. The network device may include various forms of macro base stations, micro base stations (also referred to as small cells), relay stations, access points, and the like. The network device may be a base transceiver station (Base Transceiver Station, BTS) in GSM or CDMA, may be a NodeB (NodeB, NB) in WCDMA, may be an evolved NodeB (evolved Node B, eNB, or e-NodeB) in LTE or eLTE, or may be a next-generation mobile network, for example, a base station gNB ((next) generation NodeB) in 5G (fifth generation).

A time-frequency resource used in the communications system 100 for wireless communication is described in detail below.

In the embodiments of the present invention, time domain resources used for transmitting information by the network device and the terminal device may be divided into a plurality of time units in time domain.

In addition, in this embodiment of the present invention, the plurality of time units may be consecutive, or a preset interval is set between some adjacent time units. This is not specially limited in this embodiment of the present invention.

In the embodiments of the present invention, the time unit may include a time unit used for uplink information (for example, uplink data) transmission and/or downlink information (for example, downlink data) transmission.

In the embodiments of the present invention, a length of one time unit may be randomly set. This is not specially limited in the embodiments of the present invention.

For example, one time unit may include one or more subframes; or
one time unit may include one or more slots; or
one time unit may include one or more symbols; or
one time unit may include one or more TTIs (Transmission Time Interval, TTI); or
one time unit may include one or more short transmission time intervals (short Transmission Time Interval, sTTI).

In this embodiment of the present invention, a time-frequency resource used in the communications system 100 for wireless communication may be divided into a plurality of TTIs in time domain. The TTI is a commonly used parameter in a current communications system (for example, an LTE system), and is a scheduling unit for scheduling information transmission on a radio link.

It should be understood that, in this embodiment of the present invention, the TTI may be a 1-ms TTI, or may be referred to as a subframe with a length of 1 ms, or may be an sTTI shorter than 1 ms, or may be referred to as a mini-slot (mini-slot). A length of a time domain resource occupied by the sTTI is shorter than that of the 1-ms TTI. In other words, when a TTI corresponding to a data channel is an sTTI, a length of a time domain resource occupied by the terminal device is less than 1 ms. For uplink transmission, a TTI is a time domain granularity for uplink resource allocation or uplink transmission, or a TTI is a minimum time domain unit for performing uplink transmission by the terminal device.

Due to a latency-sensitive service requirement, a structure of a shorter TTI frame needs to be introduced in a physical layer, to further shorten the scheduling interval and improve user experience. For example, a length of a TTI in the LTE system may be shortened from 1 ms to a range of 1 symbol (symbol) to 1 slot (including 7 symbols). The foregoing symbol may be an orthogonal frequency division multiplexing (Orthogonal Frequency Division Multiplexing, OFDM) symbol or a single carrier—frequency division multiple access (Single Carrier Frequency Division Multiple Access, SC-FDMA) symbol in the LTE system, or may be a symbol in another communications system. For another example, a TTI length in a 5G communications system is also less than 1 ms.

A TTI having a length less than 1 ms can be referred to as an sTTI. For example, in the LTE system, a length of the sTTI may be any length of one symbol to seven symbols, or a length of the sTTI may be a combination of at least two different lengths in one symbol to seven symbols. For example, 1 ms includes six sTTIs, and lengths of the sTTIs may be respectively three symbols, two symbols, two symbols, two symbols, two symbols, and three symbols. Alternatively, 1 ms includes four sTTIs, and lengths of the sTTIs may be respectively three symbols, four symbols, three symbols, and four symbols, or may be a combination of other different lengths.

In the embodiments of the present invention, a TTI (for example, a TTI whose length is 1 ms or longer than 1 ms) and an sTTI that are specified in the prior art (for example, the LTE system) may be collectively referred to as a TTI. In addition, in the embodiments of the present invention, a length of a TTI may be changed based on an actual requirement.

It should be understood that the foregoing listed structure of the time unit is merely an example for description. This embodiment of the present invention is not specially limited, and a structure of the time unit may be randomly changed based on an actual requirement. For example, for an LTE system that does not support the sTTI, one time unit may be one subframe (Subframe). For another example, for an LTE system that supports the sTTI, one time unit may include one sTTI, one time unit may include one slot (Slot), one time unit may include one or more (for example, a positive integer less than 7 or a positive integer less than 6) symbols, or one time unit may be one subframe.

It should be understood that when one time unit includes at least one symbol, any one of the at least one symbol may be a complete symbol or may be a part of a symbol. The part of the symbol means that a device occupies a part of a time domain resource of the symbol to send information, and the remaining part is not used to send information or is reserved as clear.

It should be noted that, in the embodiments of the present invention, a length (or information transmission duration) that is of a time unit and that is used to transmit information may be 1 ms, or may be less than 1 ms.

In this embodiment of the present invention, a frequency domain resource used by the communications system 100 includes an unlicensed frequency band. It should be understood that the present invention is applicable to a wireless cellular communications network system using an unlicensed spectrum for communication, for example, a licensed assisted access (Licensed Assisted Access, LAA) system of long term evolution (Long Term Evolution, LTE), an enhanced licensed assisted access (Enhanced Licensed Assisted Access, eLAA) system, a further enhanced licensed assisted access (Further Enhanced Licensed Assisted Access, FeLAA) system, a communications system using an unlicensed spectrum in a 5G communications system, or a MulteFire system independently working in an unlicensed spectrum. The simplified communications system 100 is used as an example in this embodiment of the present invention, and does not constitute a limitation on the technical solutions provided in the embodiments of the present invention. A person of ordinary skill in the art may know that with evolution of a network architecture and emergence of a new service scenario, the technical solutions provided in the embodiments of the present invention are also applicable to a similar technical problem.

To implement fair coexistence with network devices and terminal devices of different operators and inter-RAT such as Wi-Fi radio nodes on an unlicensed spectrum, a system working on the unlicensed spectrum, such as an LAA/eLAA/Multefire system, needs to use a listen-before-talk (Listen-Before-Talk, LBT) channel access mechanism. Before the network device performs downlink transmission or before the terminal device performs uplink transmission, the network device or the terminal device needs to listen on a channel, and occupies the channel for transmission after detecting that the channel is clear. If a sending node detects that a channel is clear before the sending node wants to occupy a resource, it is referred to as an LBT success; otherwise, it is referred to as an LBT failure.

An LBT procedure that is used by a sending node (a network device or a terminal device) to occupy a channel before transmission includes a random backoff clear channel assessment (Clear Channel Assessment, CCA) process. That the network device performs downlink transmission is used as an example. A specific procedure of the CCA process may be described as follows: The network device evenly and randomly generates a backoff counter N between 0 and a contention window size (Contention Window Size, CWS), and performs listening at a granularity of listening slot (CCA slot, for example, duration of 9 μs). If the network device detects that a channel is clear within the listening slot, the network device decreases the backoff counter by 1; or if the network device detects that a channel is busy, the network device suspends the backoff counter, that is, the backoff counter N remains unchanged in the time in which the channel is busy, until the network device detects that the channel is clear. When the backoff counter is decreased to 0 (which is referred to as backoff counter zeroization), it is referred to as an LBT success, and the network device may immediately occupy the channel to send downlink information. In addition, after the backoff counter is reset to zero, the network device may wait for a period of time instead of immediately sending the downlink information. After the waiting ends, the network device performs listening on an additional slot before a moment at which the downlink information needs to be sent. If the network device listens and detects, in the additional slot, that a channel is clear, it is considered that the channel listening succeeds, and the network device may immediately send the information. If the backoff counter is not reset to zero before the downlink information is sent, or the additional listening slot is busy, it is referred to as a channel listening failure. The network device uses a dynamically adjusted CWS in a downlink transmission process. The network device dynamically adjusts the CWS for downlink transmission based on an HARQ status that is fed back by the terminal device for a downlink reference subframe. When a proportion of negative acknowledgement (negative acknowledgement, NACK) feedbacks corresponding to the downlink reference subframe is relatively large, the network device increases the CWS, and performs channel listening in next LBT by using the increased CWS, to avoid a collision with a surrounding contention node by prolonging a listening time, thereby implementing fair coexistence. When a proportion of acknowledgement (acknowledgement, ACK) feedbacks is relatively large, the network device decreases the CWS, to reduce a listening time for faster channel access.

The uplink burst in this embodiment of the present invention may include one or more time units that are consecutive in time. For a concept of the time unit, refer to the foregoing description. Specifically, on an unlicensed spectrum, after completing successful LBT, a sending device is allowed to continuously send information for a maximum period of time on the spectrum. This period of time is referred to as a maximum channel occupancy time. Within the maximum channel occupancy time, the sending device does not need to interrupt sending to re-listen on a channel. Once the maximum channel occupancy time is exceeded, the sending device needs to stop sending to re-listen on the channel, and can perform sending again only after the LBT succeeds again. The uplink burst in the present invention is one or more time units in which the terminal device continuously performs sending after successfully completing LBT once, and total duration of the one or more time units does not exceed the maximum channel occupancy time. If the terminal device needs to continue to send the uplink information after one uplink burst interruption, the terminal device needs to listen on the channel again. A next uplink burst can be started only after LBT succeeds again. Optionally, the terminal device may send one or a combination of uplink data, uplink control information, or an uplink reference signal in the uplink burst. Optionally, two consecutive time units in the uplink burst may be inconsecutive in time.

For example, there may be a gap between two adjacent time units included in the uplink burst. For example, the uplink burst does not occupy time domain resources of start symbols and/or end symbols of some time units.

In a further enhanced licensed-assisted access (Further enhanced Licensed-Assisted Access, FeLAA) system and a Multefire 1.1 system that are introduced in Release 15, a grant-free uplink (Grant free Uplink or Grantless Uplink, GUL) transmission mechanism, or referred to as an autonomous uplink (Autonomous UL, AUL) transmission mechanism, is introduced. In this way, the terminal device does not need to send an SR or wait for a UL grant, and channel listening for the SR and the UL grant is removed. Instead, the terminal device may directly send uplink data on a reserved AUL resource after LBT succeeds. The AUL transmission mechanism described in this embodiment of the present invention includes at least one of the following features:

1. No scheduling request (Scheduling Request, SR) needs to be sent to the network device for the uplink information of the terminal device, and the network device does not need to dynamically schedule the uplink information. Instead, the terminal device independently determines to send the uplink information.

2. Different from scheduling-based uplink (Scheduling based Uplink, SUL) transmission, the network device semi-statically or semi-persistently configures, for the terminal device, the AUL radio resource used for AUL transmission, including a time domain resource and a frequency domain resource. Specifically, the AUL radio resource is configured for the terminal device by using semi-persistent RRC signaling and/or semi-persistent DCI signaling. Specifically, the AUL time domain resource is periodic, or the AUL time domain resource is a persistent time domain resource, and the SUL-based uplink information takes effect only for a limited quantity of time units.

3. The terminal device reports grant-free uplink control information (also called as Autonomous Uplink Control Information, A-UCI) when sending AUL uplink information, where the A-UCI is control information corresponding to the uplink data. The A-UCI includes at least one of HARQ process number information of an HARQ process corresponding to the uplink information, new data indicator (New Data Indicator, NDI) information, redundancy version (Redundancy Version, RV) information corresponding to the uplink information, and user identifier (denoted as a UE ID) information of the terminal device.

Before performing uplink transmission, the terminal device also needs to perform an LBT procedure. The LBT procedure used to occupy an uplink channel also includes a random backoff CCA procedure, which is referred to as a random backoff CCA-based LBT. Similar to downlink LBT, the terminal device evenly and randomly generates a backoff counter N between 0 and a CWS, and performs channel listening on a carrier at a granularity of listening slot (for example, duration of 9 μs). If the terminal device detects that the channel is clear within the listening slot, the terminal device decreases the backoff counter by 1. If the terminal device detects that the channel is busy within the listening slot, the terminal device suspends the backoff counter, that is, the backoff counter N remains unchanged within the time for which the channel is busy, and does not count the backoff counter again until the terminal device detects that the channel is clear. When the backoff counter is reset to 0, it is considered that the channel listening succeeds, and the terminal device may immediately occupy the channel to send the uplink information. In addition, after the backoff counter is reset to zero, the terminal device may wait for a period of time instead of immediately sending the uplink information. After the waiting ends, the terminal device performs listening on an additional slot before a moment at which the uplink information needs to be sent. If the terminal device listens and detects, in the additional slot, that a channel is clear, it is considered that the channel listening succeeds, and the terminal device may immediately send the information. If the backoff counter is not reset to zero before the uplink information is sent, or the additional listening slot is busy, it is referred to as a channel listening failure. Similar to downlink, when performing an LBT procedure that occupies a channel, the terminal device also uses a mechanism of dynamically adjusting a CWS. The terminal device dynamically adjusts a CWS for an uplink burst based on an HARQ status of an uplink reference subframe. When the HARQ status of the uplink reference subframe is acknowledged, the terminal device decreases the CWS. Otherwise, the terminal device increases the CWS.

It should be understood that, for a terminal device that supports AUL transmission, receiving HARQ status information includes the following cases:

1. The terminal device receives an uplink grant (uplink grant, UL grant) sent by the network device, and the network device indicates a receiving status of AUL data, that is, the HARQ status, while scheduling the terminal device. For example, on condition that the network device does not correctly receive the AUL data, but correctly identifies, by detecting sequence information (for example, a sequence of an uplink demodulation reference signal) of AUL transmission, the terminal device to which the AUL data belongs, the network device sends a UL grant to schedule the terminal device to perform retransmission on an SUL resource. If NDI in the UL grant is not toggled compared with NDI corresponding to the AUL data, that is, an NDI value does not change, it indicates that the AUL data is not correctly received. This is equivalent to a NACK feedback for the AUL data. In this case, the terminal device increases the CWS. On condition that the NDI in the UL grant is toggled compared with the NDI corresponding to the AUL data, which is equivalent to an ACK feedback of the AUL data, the terminal device decreases the CWS.

2. The terminal device receives the HARQ-ACK feedback information sent by the network device, to indicate whether previous transmission performed by the terminal device by using an HARQ process number is correctly received. For example, if previous transmission performed based on an HARQ process number is correctly received, the network device sends an ACK to the terminal device; or if previous transmission performed based on an HARQ process number is not correctly received, the network device sends a NACK to the terminal device. Further, the HARQ-ACK feedback information may be a plurality of pieces of HARQ-ACK information respectively corresponding to a plurality of AUL HARQ processes. Therefore, the HARQ-ACK feedback information may be carried on an independent downlink control channel. The downlink control channel generally does not need to include resource allocation information, but may include information such as power control information. Optionally, the HARQ-ACK feedback information may alternatively include resource allocation information, power control information, and the like.

It should be understood that CWS values available for the terminal device form a CWS set. When increasing a CWS, the terminal device increases the CWS to a next higher value in the CWS set. When reducing a CWS, the terminal device decreases the CWS to a smallest value in the CWS set. For example, the CWS set may be {3, 7}, {7, 15}, or {15, 31, 63, 127, 255, 511, 1023}.

In this embodiment, increasing a CWS may be increasing a CWS to a next level, for example, increasing 3 to 7, or increasing 63 to 127.

For grant-free uplink transmission, the network device does not know in advance that the terminal device sends the AUL transmission. Therefore, after the terminal device sends the AUL transmission, when the network device does not correctly receive the AUL transmission from the terminal device and does not identify the terminal device corresponding to the AUL transmission, the network device cannot feed back corresponding HARQ status (a UL grant, an HARQ-ACK feedback, or the like) information to the terminal device. The terminal device corresponding to the AUL transmission may not be identified due to a conflict caused because a plurality of terminal devices simultaneously perform AUL transmission on a reserved resource. Consequently, the network device does not identify an uplink sequence (for example, an uplink demodulation reference signal) sent by any terminal device, or even if the uplink sequence is identified, the network device cannot identify the terminal device only by using the uplink sequence. For example, the network device may have not correctly received or decoded uplink control information, and the uplink control information carries identification information of the terminal device. In the foregoing case, the terminal device cannot receive any HARQ status information after the AUL transmission, and cannot adjust an uplink CWS based on the HARQ status information fed back by the network device in the prior art, to adapt to a channel status.

In another possible case, the network device identifies, through uplink sequence detection, the terminal device that performs AUL transmission, or correctly decodes uplink control information and uplink data information. However, considering system overheads, the network device does not immediately feed back HARQ status information to the AUL terminal device, but waits for the terminal device to perform AUL transmission for a plurality of times. Then, HARQ-ACK feedback information corresponding to HARQ processes of a plurality of AUL transmissions is simultaneously fed back through one downlink transmission. In this case, that the HARQ status information is not received within a period of time after an uplink burst does not indicate that an uplink channel status becomes poor. If the terminal device increases the CWS in this case, the terminal device possibly cannot occupy a channel within a longer time. Consequently, channel resource utilization may be reduced, and transmission efficiency of the terminal device may be reduced.

To resolve the foregoing problem, an embodiment of the present invention provides a method for listening on an uplink channel, to properly adjust a CWS when a terminal device does not receive HARQ status information in a scenario of grant-free transmission on an unlicensed spectrum, to adapt to a channel status and avoid excessive penalty on an uplink CWS.

Figure 2:
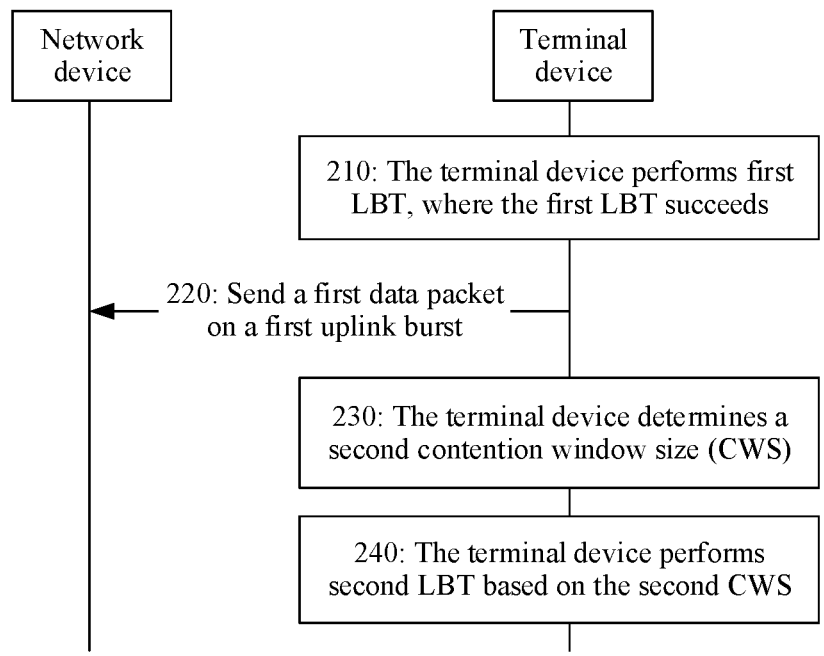
FIG. 2 is a schematic communication diagram of a method for listening on an uplink channel according to an embodiment of the present invention.

The method provided in the embodiments of the present invention is described in detail with reference to FIG. 2 to FIG. 9. FIG. 2 is a schematic diagram of a method for listening on a channel according to an embodiment of the present invention.

Step 210: A terminal device performs first LBT.

Figure 12:
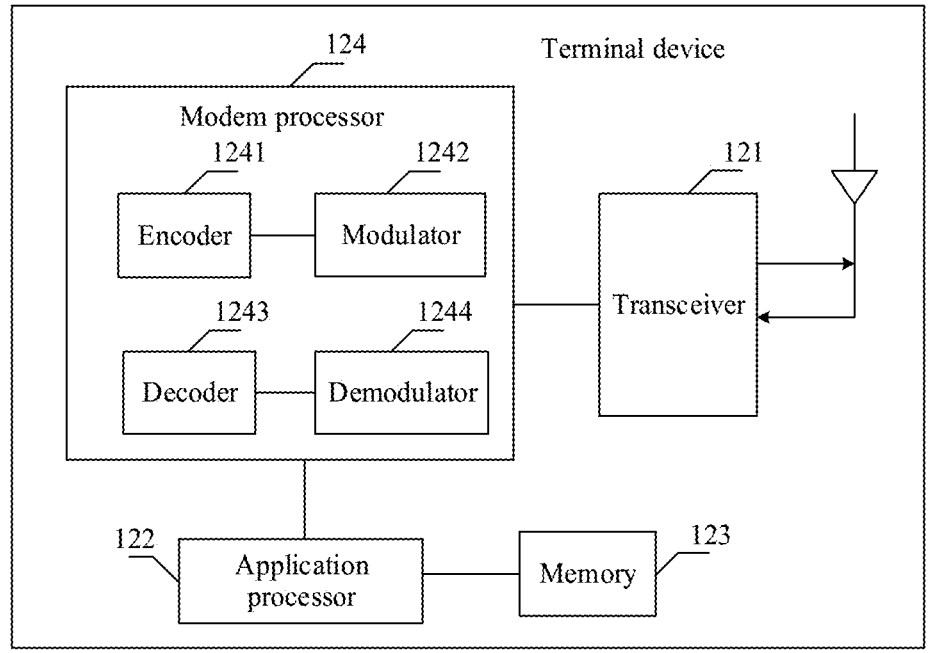
FIG. 12 is a schematic block diagram of an apparatus for listening on an uplink channel according to an embodiment of the present invention.

The operation in this step may be implemented by a modem processor 124 of a terminal device in FIG. 12.

Step 220: The terminal device sends a first data packet on a first uplink burst after the first LBT succeeds.

It should be understood that one uplink burst is a time-frequency resource occupied for sending a data packet after the terminal device successfully performs random backoff CCA-based LBT once. The uplink burst includes at least one time unit, and the at least one time unit may be consecutive in time. For example, TTIs or subframe sequence numbers included in the uplink burst are consecutive. Alternatively, the at least one time unit may be inconsecutive in time. There may be an interval between any two adjacent time units included in the uplink burst. For example, the uplink burst does not occupy a time domain resource at a start or an end of the time unit. This is not limited in this embodiment of the present invention.

It should be further understood that the terminal device sends grant-free AUL uplink information in the first uplink burst, or sends a part of AUL uplink information in the first burst. The foregoing description is also applicable to another uplink burst in this embodiment of the present invention, for example, a second uplink burst and a third uplink burst. Any two different uplink bursts are inconsecutive in time, for example, a first uplink burst and a second uplink burst in FIG. 2.

The sending action in this step may be implemented by a transceiver 121 of the terminal device in FIG. 12. Certainly, the action may alternatively be implemented by the modem processor 124 of the terminal device in FIG. 12 by controlling the transceiver 121.

Step 230: The terminal device determines a second contention window size CWS.

In a first manner, on condition that a first time length is greater than or equal to a first time threshold, and the terminal device does not receive first indication information indicating an HARQ status after the first uplink burst, the second CWS is greater than a first CWS.

The operation in this step may be implemented by the modem processor 124 of the terminal device in FIG. 12.

Optionally, the terminal device sends a second data packet on a second uplink burst on condition that a second LBT succeeds, where the second uplink burst is later than the first uplink burst.

Optionally, the first indication information indicating the HARQ status includes HARQ status information corresponding to AUL transmission and SUL transmission, or the first indication information indicating the HARQ status includes HARQ status information corresponding to AUL transmission but does not include HARQ status information corresponding to SUL transmission. It should be understood that the foregoing description of the first indication information indicating the HARQ status is also applicable to another embodiment of the present invention.

In this embodiment of the present invention, a timer is introduced to determine a CWS. A second reference time unit corresponding to the first uplink burst is a start point of the timer corresponding to the first uplink burst. Specifically, a start moment of the timer is an end moment or a start moment of the second reference time unit, and a length of the timer is the first time threshold. In this embodiment of the present invention, an example in which the start moment of the timer is the end moment of the second reference time unit is used. It should be understood that the foregoing description of the start point and the length of the timer is also applicable to a timer corresponding to another burst in this embodiment of the present invention. For example, in another embodiment of the present invention, a second reference time unit corresponding to the second uplink burst is a start point of the timer corresponding to the second uplink burst.

It should be noted that there are the following possible cases for the second reference time unit corresponding to the first uplink burst:

Case 1

The second reference time unit corresponding to the first uplink burst is a time unit in the first uplink burst, for example, a subframe or a TTI. Optionally, the second reference time unit corresponding to the first uplink burst is an end subframe or TTI in the first uplink burst. Specifically, a start point of a timer corresponding to the first uplink burst is an end moment of the first uplink burst, as shown in (a) in FIG. 3. Optionally, the second reference time unit corresponding to the first uplink burst is an earliest subframe or TTI in the first uplink burst. Specifically, a start point of a timer corresponding to the first uplink burst is an end moment of the earliest subframe or TTI in the first uplink burst, as shown in (b) in FIG. 3.

Case 2

The second reference time unit corresponding to the first uplink burst is a time unit at an interval of a third time length after a target time unit in the first uplink burst. Optionally, the target time unit in the first uplink burst is the first time unit in the first uplink burst. For example, the target time unit is the first subframe or TTI in the first uplink burst. Specifically, a start point of a timer corresponding to the first uplink burst is a moment at a third time length after the first subframe or TTI in the first uplink burst, as shown in (c) in FIG. 3.

Optionally, a second time length may be defined in a protocol or a regulation, for example, may be preset in the terminal device. Alternatively, the second time length may be configured by a network device by using higher layer signaling or notified by a network device by using physical layer signaling. Further, the second time length may be an HARQ status information feedback delay or greater than the feedback delay. Specifically, after receiving uplink data information, the network device feeds back the HARQ status information of the data information with a delay. For example, HARQ status information corresponding to data information in a time unit #n may be first fed back in a time unit #n+k. In this case, the HARQ status information feedback delay is referred to as k time units. Optionally, the second time length may be k subframes or TTIs. For example, the second time length may be k=4 subframes or TTIs.

It should be understood that two possible cases of the second reference time unit corresponding to the first uplink burst are also applicable to a second reference time unit corresponding to another uplink burst in this embodiment of the present invention, for example, the second reference time unit corresponding to the second uplink burst. Details are not described below again.

In a possible design, a first reference time unit is a time unit in which the terminal device determines the second CWS. For example, if the terminal device determines the second CWS in a TTI, the first reference time unit is the TTI or a start time unit of the second uplink burst. For example, the start time unit may be a start time unit determined by the terminal device based on a time sequence relationship. The following separately describes two possibilities of the first reference time unit:

Possibility 1: The first reference time unit is a time unit in which the terminal device determines the second CWS. In this case, the first time length is a time length from the start point of the timer corresponding to the first uplink burst to the time unit in which the terminal device determines the second CWS. In this possibility, that the first time length is greater than the first time threshold indicates that the time unit in which the terminal device determines the second CWS exceeds the end point of the timer corresponding to the first uplink burst, and this is referred to as that the first reference time unit exceeds the timer.

It should be understood that the time unit in which the terminal device determines the second CWS is a time unit before the terminal device performs the second LBT. For example, the terminal device needs to send uplink AUL information, and needs to determine, before the second LBT occupies an unlicensed channel, the second CWS corresponding to the second LBT.

Optionally, in the time unit in which the terminal device determines the second CWS, the terminal device does not need to send uplink AUL information. For example, on condition that the timer corresponding to the first uplink burst expires and no HARQ status information is received, the terminal device immediately increases a CWS, that is, determines the second CWS. After a period of time, when the terminal device needs to send uplink AUL information, the terminal device performs the second LBT based on the second CWS, and sends uplink information in the second uplink burst on condition that the second LBT succeeds.

Possibility 2: The first reference time unit is a start time unit of the second uplink burst. For example, the start time unit may be a start time unit determined by the terminal device based on a time sequence relationship. Optionally, the start time unit of the second uplink burst may be the first (earliest) subframe or TTI in the second uplink burst. In this possibility, that the first time length is greater than the first time threshold indicates that the start time unit or the start moment of the second uplink burst exceeds the end point of the timer corresponding to the first uplink burst, and this is referred to as that the first reference time unit exceeds the timer.

It should be understood that the two possible cases of the first reference time unit are also applicable to a first reference time unit corresponding to another uplink burst in this embodiment of the present invention, for example, a first reference time unit corresponding to a third uplink burst. Details are not described below again.

An interval between the first reference time unit and the second reference time unit that corresponds to the first uplink burst is the first time length, that is, an interval between the first reference time unit and the start point of the timer corresponding to the first uplink burst is the first time length.

On condition that the first time length is greater than or equal to the first time threshold, and the terminal device does not receive first indication information indicating an HARQ status after the first uplink burst, the second CWS is greater than a first CWS, where the first CWS is a CWS corresponding to LBT previous to the second LBT. As shown (a), (b), and (c) in FIG. 2, the terminal device does not receive the first indication information indicating the HARQ status after the first uplink burst, and the first reference time unit corresponding to the second uplink burst exceeds a timer T1 corresponding to the first uplink burst. It should be understood that, as described above, the first indication information indicating the HARQ status includes at least one of HARQ-ACK feedback information and a UL grant. In this case, the terminal device increases the CWS. In other words, the second CWS is greater than the first CWS, and the first CWS is a CWS corresponding to LBT previous to the second LBT. Specifically, the LBT previous to the second LBT refers to previous random backoff CCA-based LBT. Unless otherwise specified, the LBT described in this embodiment of the present invention is random backoff CCA-based LBT. Details are not described below.

It should be understood that a CWS corresponding to each time of LBT performed by the terminal device is adjusted based on the CWS corresponding to the previous LBT performed by the terminal device, and the adjustment includes increasing, keeping unchanged, and reduction. For example, if it is determined that the CWS corresponding to current LBT is to be increased, the CWS corresponding to the current LBT is increased to a next higher value in a CWS set compared with the CWS corresponding to the previous LBT. If it is determined that the CWS corresponding to the current LBT remains unchanged, the CWS corresponding to the current LBT remains the same as the CWS corresponding to the previous LBT.

The first CWS and the second CWS correspond to a same access priority. In other words, the first CWS is a CWS of the LBT previous to the second LBT corresponding to a same access priority as the second CWS.

It should be understood that when accessing a channel, each terminal device may perform LBT based on a service type by using one of at least two access priorities (Priority class). Each access priority corresponds to a particular CWS value set. For example, for four access priorities, a CWS set with an access priority 1 is {3, 7}, a CWS set with an access priority 2 is {7, 15}, a CWS set with an access priority 3 is {15, 31, 63, 127, 255, 511, 1023}, and a CWS set with an access priority 4 is {15, 31, 63, 127, 255, 511, 1023}. Each time the terminal device adjusts the CWS before performing LBT, an adjustment operation of increasing, decreasing, or keeping the CWS unchanged is performed for each of the at least two access priorities, and is not limited to an access priority used for performing the LBT. For example, for the four access priorities, before the terminal device performs LBT by using the access priority 1, if the CWS needs to be increased, for each of the four access priorities, the CWS is increased to a next higher value in a CWS value set corresponding to the access priority, and then a CWS value adjusted based on the access priority 1 is used to perform LBT. Therefore, a magnitude relationship between any two CWSs described in this embodiment of the present invention refers to a relationship between two CWSs with a same access priority. For example, that the second CWS is greater than the first CWS means that for any access priority, the first CWS corresponding to the first LBT is increased to the second CWS corresponding to the second LBT. For another example, that the second CWS is equal to the first CWS means that for any access priority, the second CWS corresponding to the second LBT is kept equal to the first CWS corresponding to the first LBT.

It should be understood that the descriptions of the first CWS and the second CWS corresponding to a same access priority are also applicable to another embodiment of the present invention. A magnitude relationship between any two CWSs described in this embodiment of the present invention is a relationship between two CWSs with a same access priority.

Optionally, that the terminal device does not receive the first indication information indicating the HARQ status after the first uplink burst may be that the terminal device does not receive, the first indication information indicating the HARQ status after the first uplink burst and before the second uplink burst, or may be that the terminal device does not receive the first indication information indicating the HARQ status after the second reference time unit corresponding to the first uplink burst and before the first reference time unit, or may be that the terminal device does not receive the first indication information indicating the HARQ status within a first time threshold starting from the second reference time unit corresponding to the first uplink burst.

Figure 3:
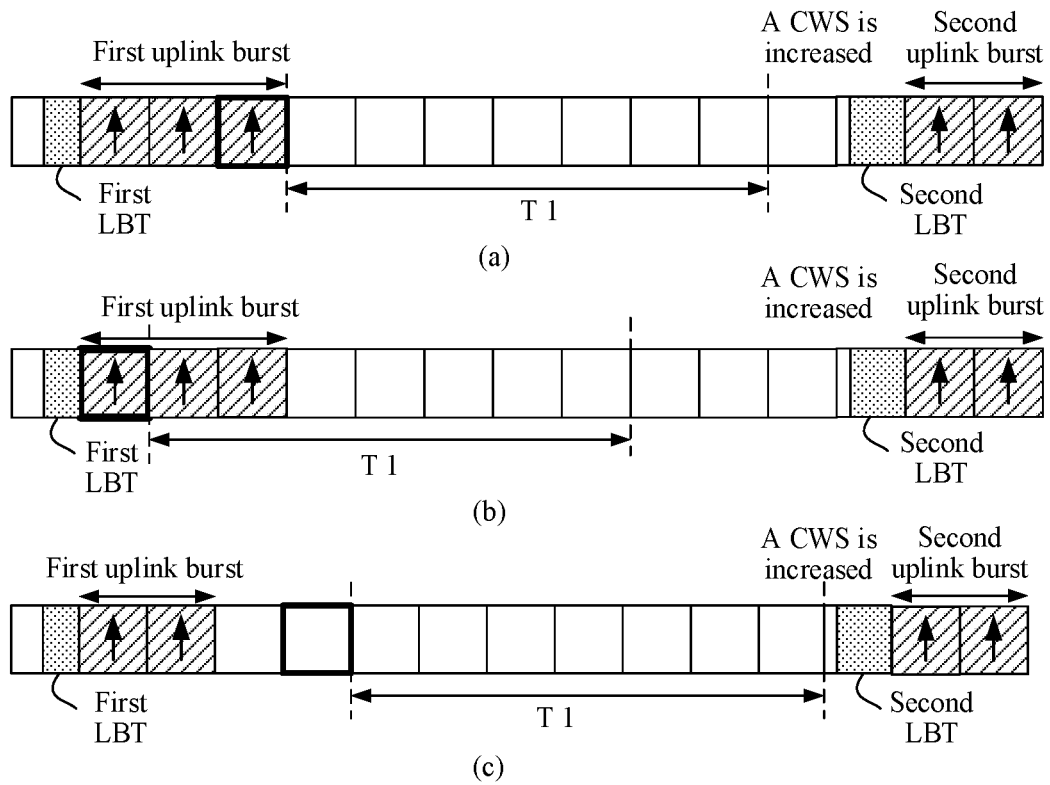
FIG. 3 to FIG. 7 are sequence diagrams of a method for listening on an uplink channel according to an embodiment of the present invention.

Optionally, on condition that the first time length is greater than the first time threshold, and the terminal device does not receive first indication information indicating an HARQ status within a time between the second reference time unit corresponding to the first uplink burst and the first reference time unit, the second CWS is greater than the first CWS, where the first CWS is a CWS corresponding to LBT previous to the second LBT, in other words, the terminal device increases the CWS. As shown in FIG. 3, in a possible case, the terminal device receives, in the second reference time unit corresponding to the first uplink burst, that is, before the start point of the timer and after the first uplink burst, the first indication information indicating the HARQ status. In this case, for the second uplink burst by which the first reference time unit exceeds the timer, the terminal device increases the CWS.

Figure 4:
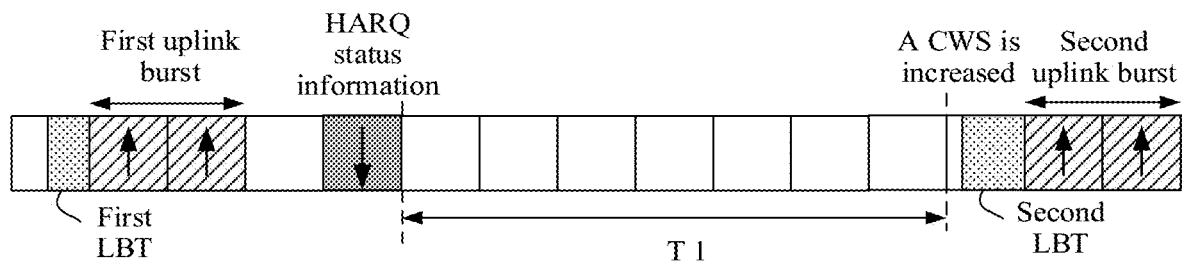

Optionally, on condition that the first time length is greater than the first time threshold, and the terminal device does not receive first indication information indicating an HARQ status within the first reference time threshold starting from the second reference time unit corresponding to the first uplink burst, the second CWS is greater than the first CWS, where the first CWS is a CWS corresponding to LBT previous to the second LBT, in other words, the terminal device increases the CWS. As shown in FIG. 4, in a possible case, the terminal device receives the first indication information indicating the HARQ status after the timer corresponding to the first uplink burst expires and before the first reference time unit. In this case, for the second uplink burst by which the first reference time unit exceeds the timer, the terminal device increases the CWS.

In a second manner, on condition that the first time length is less than or equal to the first time threshold, and the terminal device does not receive the first indication information indicating the HARQ status after the first uplink burst, the second CWS is equal to the first CWS.

It should be understood that the LBT previous to the second LBT refers to previous random backoff CCA-based LBT.

Figure 5:
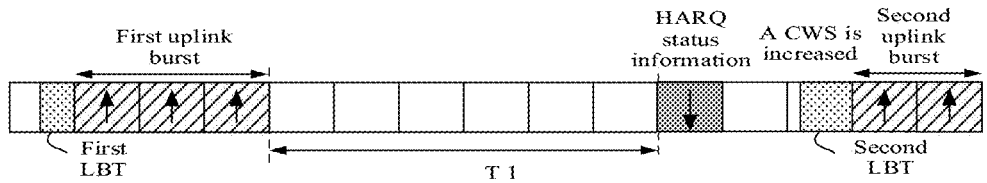

As shown in FIG. 5, the terminal device does not receive the first indication information indicating the HARQ status after the first uplink burst, and the first reference time unit corresponding to the second uplink burst does not exceed a timer T1 corresponding to the first uplink burst. It should be understood that, as described above, the first indication information indicating the HARQ status includes at least one of HARQ-ACK feedback information and a UL grant. In this case, the terminal device does not increase the CWS. In other words, the second CWS is equal to the first CWS, and the first CWS is a CWS corresponding to the LBT previous to the second LBT.

Optionally, in this possible design, when the second reference time unit corresponding to the first uplink burst meets the case 3 described above, that the terminal device determines the second CWS includes: When the first reference time unit is not later than the second reference time unit corresponding to the first uplink burst, or when the first time length is less than the first time threshold, and the terminal device does not receive, between the second reference time unit corresponding to the first uplink burst and the first reference time unit, the first indication information including the HARQ status, the terminal device does not increase the CWS. In other words, the second CWS is equal to the first CWS, and the first CWS is a CWS corresponding to the LBT previous to the second LBT.

Optionally, in a third manner, on condition that the first time length is less than or equal to the first time threshold, and the terminal device does not receive the first indication information indicating the HARQ status after the first uplink burst, the second CWS is determined based on second indication information, where the second indication information is indication information that is received by the terminal device before the first uplink burst and that is used to indicate the HARQ status.

Figure 6:
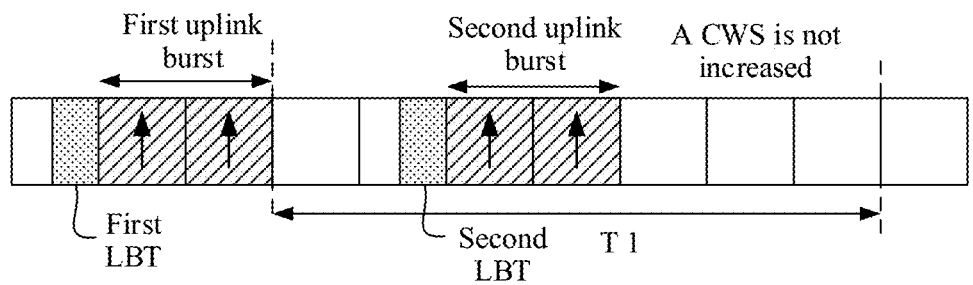

As shown in FIG. 6, the terminal device does not receive the first indication information indicating the HARQ status after the first uplink burst, and the first reference time unit corresponding to the second uplink burst does not exceed a timer T1 corresponding to the first uplink burst. It should be understood that, as described above, the first indication information indicating the HARQ status includes at least one of HARQ-ACK feedback information and a UL grant. In this case, the terminal device determines the second CWS based on the HARQ status information before the first uplink burst. The terminal device may adjust the CWS based on the HARQ status information by using a method in the prior art.

It should be noted that the foregoing three manners may be used as independent solutions, or any two of the foregoing three manners are used as an overall solution, or the three solutions may be used as an overall solution.

Optionally, in a possible design, on condition that the first time length is greater than or equal to the first time threshold, and the terminal device does not receive, within a time after the first uplink burst and before the second uplink burst, the first indication information indicating the HARQ status, and the second uplink burst is an uplink burst immediately after a third reference time unit corresponding to the first uplink burst, the terminal device increases the CWS. In other words, the second CWS is greater than the first CWS, the first CWS is a CWS corresponding to the LBT previous to the second LBT, and the third reference time unit corresponding to the first uplink burst is later than the second reference time unit corresponding to the first uplink burst, a time interval between the third reference time unit corresponding to the first uplink burst and the second reference time unit corresponding to the first uplink burst is the first time threshold. It should be understood that the third reference time unit corresponding to the first uplink burst is an end time unit of the timer corresponding to the first uplink burst. In this possible design, the terminal device increases the CWS only for the first uplink burst that appears after the timer corresponding to the first uplink burst expires. Optionally, the second uplink burst may be the first AUL uplink burst after the third reference time unit corresponding to the first uplink burst. Optionally, the second uplink burst may be a $1^{st}$ uplink burst on which random backoff CCA-based LBT is performed, after the third reference time unit corresponding to the first uplink burst. Optionally, the second uplink burst may be a $1^{st}$ AUL uplink burst on which random backoff CCA-based LBT is performed, after the third reference time unit corresponding to the first uplink burst.

The terminal device performs the method provided in this embodiment of the present invention, and determines the CWS with reference to a time threshold, for example, a timer. The time threshold, for example, the timer, is set, so that the CWS is increased if the first reference time unit exceeds the timer and no HARQ status information is received, thereby avoiding that because there is a delay in feeding back the HARQ status information, the CWS is increased when HARQ status information fed back by a network device is not received within a time interval (for example, a time interval less than the delay) after one uplink burst. Therefore, it is avoided that a success rate of accessing a channel by the terminal device is reduced due to an excessive increase of the CWS, so that the terminal device can more properly adapt to a channel status when performing AUL uplink transmission.

Figure 8:
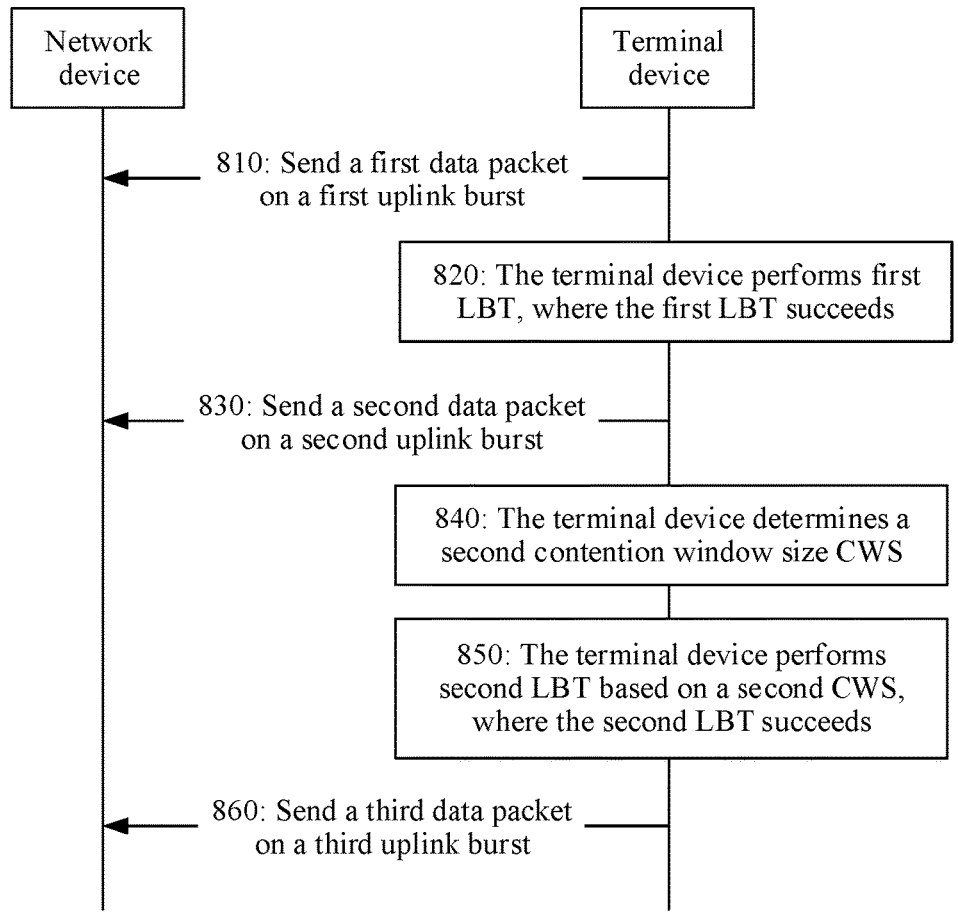
FIG. 8 is a schematic communication diagram of another method for listening on an uplink channel according to an embodiment of the present invention.
Figure 9:
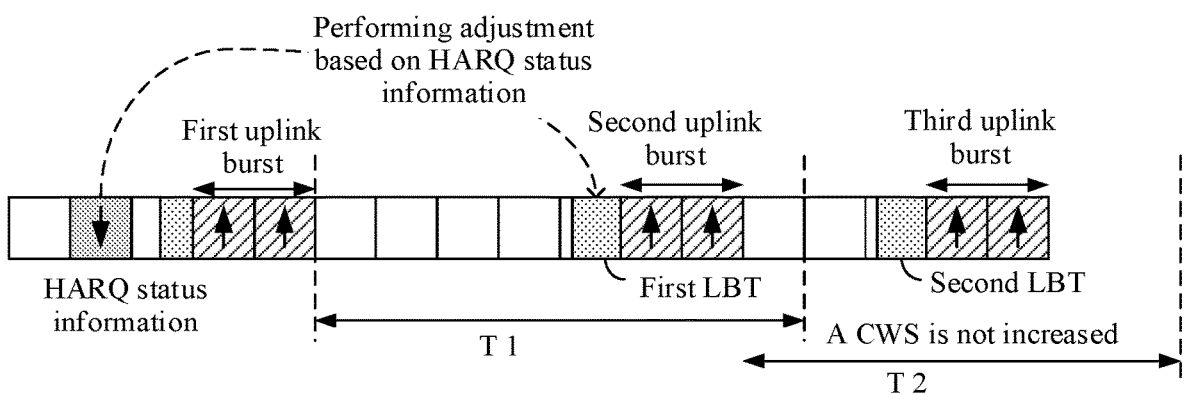
FIG. 9 and FIG. 10 are sequence diagrams of another method for listening on an uplink channel according to an embodiment of the present invention.
Figure 10:
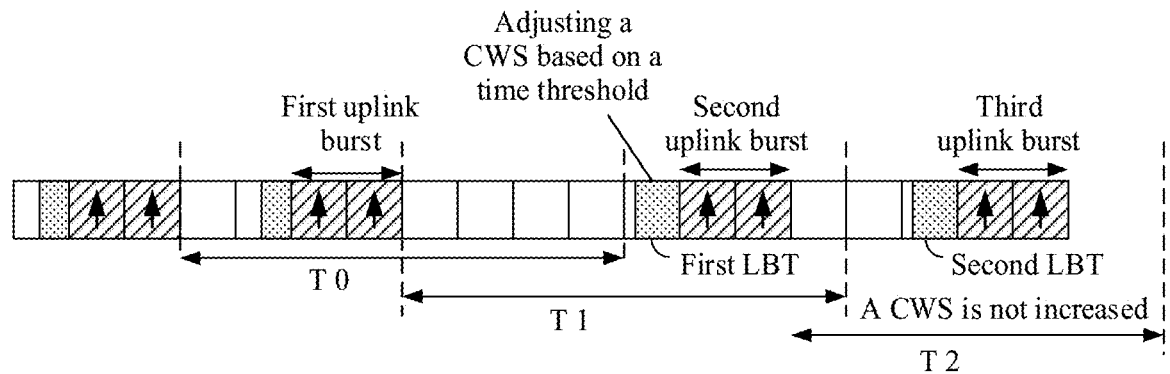

FIG. 8 is a schematic process diagram of a method for listening on an uplink channel according to an embodiment of the present invention. FIG. 9 and FIG. 10 are sequence diagrams of a method according to an embodiment of the present invention. The following describes the method provided in the embodiments of the present invention with reference to FIG. 8 to FIG. 10.

Step 810: A terminal device sends a first data packet on a first uplink burst.

Step 820: The terminal device performs first LBT.

The operation in this step may be implemented by a modem processor 124 of a terminal device in FIG. 12.

Step 830: Send a second data packet on a second uplink burst after the first LBT succeeds, where the second uplink burst is later than the first uplink burst.

The sending action in the foregoing step may be implemented by the transceiver 121 of the terminal device in FIG. 12. Certainly, the action may alternatively be implemented by a modem processor 124 of the terminal device in FIG. 12 by controlling the transceiver 121.

Step 840: The terminal device determines a second contention window size CWS.

An interval between a first reference time unit and a second reference time unit that corresponds to the first uplink burst is a first time length, and an interval between the first reference time unit and a second reference time unit that corresponds to the second uplink burst is a second time length.

In a first manner, on condition that the second time length is less than a first time threshold, and the first time length is greater than or equal to the first time threshold, the terminal device does not receive first indication information indicating an HARQ status after the first uplink burst, and a first CWS corresponding to the first LBT is not increased compared with a third CWS, the second CWS is greater than a fourth CWS, where the fourth CWS is a CWS corresponding to LBT previous to second LBT, and the third CWS is a CWS corresponding to LBT previous to the first LBT.

In a second manner, on condition that the second time length is less than a first time threshold, and the first time length is greater than or equal to the first time threshold, the terminal device does not receive first indication information indicating an HARQ status after the first uplink burst, and a first CWS corresponding to the first LBT is increased compared with a third CWS, the second CWS is equal to a fourth CWS, where the fourth CWS is a CWS corresponding to LBT previous to second LBT, and the third CWS is a CWS corresponding to LBT previous to the first LBT.

Specifically, if a third uplink burst exceeds a timer corresponding to the first uplink burst, in other words, the first time length is greater than or equal to the first time threshold, when there is a second uplink burst between the first uplink burst and the third uplink burst, where a CWS corresponding to the second uplink burst is an adjusted CWS, and the first reference time unit does not exceed a timer corresponding to the second uplink burst, in other words, the second time length is less than the first time threshold, the terminal device does not increase the second CWS. In other words, the terminal device restarts a new timer for the second uplink burst on which the CWS has been adjusted, and determines, based on a receiving status of an HARQ status and a time interval between the second uplink burst and the third uplink burst, a CWS corresponding to the third uplink burst.

Further, that the terminal device adjusts the CWS for the second uplink burst means that the terminal device increases the CWS for the second uplink burst. In other words, if there is an uplink burst between the first uplink burst and the third uplink burst, and a CWS corresponding to the uplink burst remains unchanged compared with a CWS corresponding to previous LBT, or is decreased compared with a CWS corresponding to previous LBT, the terminal device needs to increase the second CWS. The terminal device does not increase the second CWS corresponding to the third uplink burst only when the CWS corresponding to the second uplink burst is increased, to avoid repeatedly punishing the CWS. If the second uplink burst keeps the CWS unchanged or decreases the CWS, the terminal device increases the CWS, that is, the second CWS is greater than the fourth CWS, where the fourth CWS is a CWS corresponding to the LBT previous to the second LBT. It should be understood that the LBT previous to the second LBT refers to previous random backoff CCA-based LBT.

Figure 7:
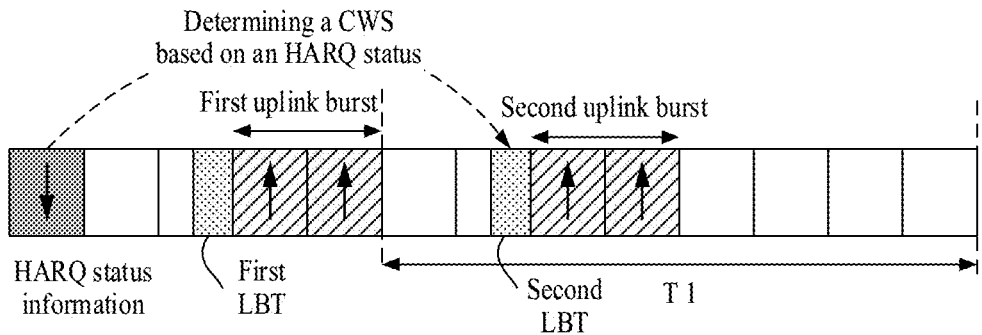

Optionally, the CWS corresponding to the second uplink burst may be increased based on indication information including an HARQ status. As shown in FIG. 7, for example, HARQ status information received by the terminal device before the first uplink burst is a NACK. Therefore, the terminal device increases the CWS corresponding to the second uplink burst.

Optionally, the CWS corresponding to the second uplink burst may be increased due to HARQ status reception timeout. As shown in FIG. 8, for example, the second uplink burst exceeds a timer of a previous burst, and no HARQ status information is received between the two bursts. Therefore, the terminal device increases the CWS corresponding to the second uplink burst.

It should be noted that the first manner and the second manner herein may be used as an overall solution, or may be used as independent solutions.

The operation in this step may be implemented by a modem processor 124 of a terminal device in FIG. 12.

Step 850: Perform the second LBT based on the second CWS.

The operation in this step may be implemented by the modem processor 124 of the terminal device in FIG. 12.

Step 860: Send a third data packet on the third uplink burst on condition that the second LBT succeeds, where the third uplink burst is later than the second uplink burst.

The sending action in this step may be implemented by a transceiver 121 of the terminal device in FIG. 12. Certainly, the action may alternatively be implemented by the modem processor 124 of the terminal device in FIG. 12 by controlling the transceiver 121.

It should be understood that the foregoing descriptions of the CWS and the LBT are also applicable to this embodiment, and details are not described herein again.

In a possible design, the first reference time unit is a time unit in which the terminal device determines the second CWS. For example, if the terminal device determines the second CWS in a TTI, the first reference time unit is the TTI or a start time unit of the third uplink burst. For example, the start time unit may be a start time unit determined by the terminal device based on a time sequence relationship.

Optionally, the second reference time unit corresponding to the first uplink burst is a time unit in the first uplink burst;

or the second reference time unit corresponding to the first uplink burst is a time unit that has an interval of a third time length from a start time unit of the first uplink burst, and the second reference time unit is after the start time unit of the first uplink burst; and the second reference time unit corresponding to the second uplink burst is a time unit in the second uplink burst; or the second reference time unit corresponding to the second uplink burst is a time unit that has an interval of a third time length from a start time unit of the second uplink burst, and the second reference time unit is after the start time unit of the first uplink burst.

Further, the second reference time unit corresponding to the first uplink burst may be different from the second reference time unit corresponding to the second uplink burst.

Optionally, the second reference time unit corresponding to the first uplink burst is the start time unit of the first uplink burst; or the second reference time unit corresponding to the second uplink burst is the start time unit of the second uplink burst.

Optionally, the first CWS and the third CWS correspond to a same access priority, and the second CWS and the fourth CWS correspond to a same access priority.

It should be understood that a CWS corresponding to each time of LBT performed by the terminal device is adjusted based on the CWS corresponding to the previous LBT performed by the terminal device, and the adjustment includes increasing, keeping unchanged, and reduction. For example, if it is determined that the CWS corresponding to current LBT is to be increased, the CWS corresponding to the current LBT is increased to a next higher value in a CWS set compared with the CWS corresponding to the previous LBT. If it is determined that the CWS corresponding to the current LBT remains unchanged, the CWS corresponding to the current LBT remains the same as the CWS corresponding to the previous LBT.

It should be understood that when accessing a channel, each terminal device may perform LBT based on a service type by using one of at least two access priorities (Priority class). Each access priority corresponds to a particular CWS value set. For example, for four access priorities, a CWS set with an access priority 1 is {3, 7}, a CWS set with an access priority 2 is {7, 15}, a CWS set with an access priority 3 is {15, 31, 63, 127, 255, 511, 1023}, and a CWS set with an access priority 4 is {15, 31, 63, 127, 255, 511, 1023}. Each time the terminal device adjusts the CWS before performing LBT, an adjustment operation of increasing, decreasing, or keeping the CWS unchanged is performed for each of the at least two access priorities, and is not limited to an access priority used for performing the LBT. For example, for the four access priorities, before the terminal device performs LBT by using the access priority 1, if the CWS needs to be increased, for each of the four access priorities, the CWS is increased to a next higher value in a CWS value set corresponding to the access priority, and then a CWS value adjusted based on the access priority 1 is used to perform LBT. Therefore, a magnitude relationship between any two CWSs described in this embodiment of the present invention refers to a relationship between two CWSs with a same access priority. For example, that the second CWS is greater than the first CWS means that for any access priority, the first CWS corresponding to the first LBT is increased to the second CWS corresponding to the second LBT. For another example, that the second CWS is equal to the first CWS means that for any access priority, the second CWS corresponding to the second LBT is kept equal to the first CWS corresponding to the first LBT.

Optionally, the first reference time unit is a time unit in which the terminal device determines the second CWS.

Optionally, the first reference time unit is a start time unit of the second uplink burst.

Optionally, the LBT previous to the second LBT is the same as the first LBT.

Further, the second time length may be predefined or received from a network device.

Optionally, the third time length may relate to the delay indicated by the network device.

According to the method provided in this embodiment, on condition that the HARQ status information is not received after the first uplink burst, and the terminal device has increased the CWS corresponding to the second uplink burst between the first uplink burst and the third uplink burst, and the first reference time unit does not exceed timer duration of the second uplink burst, the terminal device does not increase, because the third uplink burst exceeds timer duration corresponding to the first uplink burst, the CWS corresponding to the third uplink burst, but keeps the CWS corresponding to the third uplink burst unchanged. Compared with the method in which the terminal device increases the CWS provided that the first reference time exceeds the timer duration, this method can avoid that the CWS is increased again due to timer expiration when the CWS has been increased in a short time, thereby avoiding excessive penalty on the CWS, and improving properness of adjusting the CWS by the terminal device in an AUL scenario.

Figure 11:
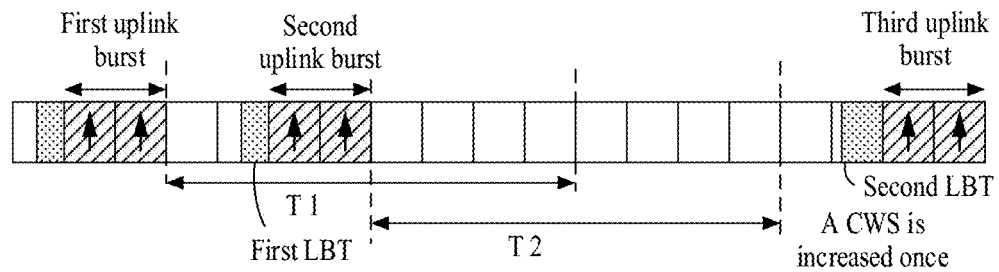
FIG. 11 is a sequence diagram of still another method for listening on an uplink channel according to an embodiment of the present invention.

FIG. 11 is a sequence diagram of still another method for listening on an uplink channel according to an embodiment of the present invention. Still another method provided in the embodiments of the present invention is described below with reference FIG. 8 and FIG. 11.

Step 810: A terminal device sends a first data packet on a first uplink burst.

Step 820: The terminal device performs first LBT.

The operation in this step may be implemented by a modem processor 124 of a terminal device in FIG. 12.

Step 830: Send a second data packet on a second uplink burst after the first LBT succeeds, where the second uplink burst is later than the first uplink burst.

Step 840: The terminal device determines a second contention window size CWS.

An interval between a first reference time unit and a second reference time unit that corresponds to the first uplink burst is a first time length, and an interval between the first reference time unit and a second reference time unit that corresponds to the second uplink burst is a second time length. On condition that the second time length is greater than or equal to a first time threshold, and the first time length is greater than or equal to the first time threshold, and the terminal device does not receive first indication information indicating an HARQ status after the first uplink burst, the second CWS is a CWS increased on a basis of a first CWS, and the first CWS is a CWS corresponding to LBT previous to the first LBT.

It should be understood that the foregoing descriptions of the CWS and the LBT are also applicable to this embodiment, and details are not described herein again.

Specifically, on condition that a third uplink burst exceeds a timer corresponding to the first uplink burst, that is, the first time length is greater than or equal to the first time threshold, and the third uplink burst exceeds a timer corresponding to the second uplink burst, that is, the second time length is greater than or equal to the first time threshold, and the terminal device does not receive, after the first uplink burst and before the third uplink burst, the first indication information indicating the HARQ status, the terminal device increases the CWS only once. To be specific, the first CWS is a CWS obtained by increasing the second CWS once, and the second CWS is a CWS corresponding to LBT previous to the first LBT.

As shown in FIG. 9, the third uplink burst exceeds both a timer T1 corresponding to the first uplink burst and a timer T2 corresponding to the second uplink burst, and the terminal device does not receive, between the first uplink burst and the third uplink burst, the first indication information indicating the HARQ status. In this case, the terminal device increases the CWS only once. Specifically, a first CWS corresponding to the third uplink burst is greater than the second CWS, where the second CWS is a CWS corresponding to the LBT previous to the first LBT, and the first CWS is a smallest CWS in CWSs that are greater than the second CWS and that are in a set of CWSs having a same access priority. It should be noted that a concept of the access priority is described above, and details are not described herein again.

The operation in this step may be implemented by the modem processor 124 of the terminal device in FIG. 12.

Step 850: Perform second LBT based on the second CWS.

The operation in this step may be implemented by the modem processor 124 of the terminal device in FIG. 12.

Step 860: Send a third data packet on the third uplink burst on condition that the second LBT succeeds, where the third uplink burst is later than the second uplink burst.

The sending action in the foregoing step may be implemented by the transceiver 121 of the terminal device in FIG. 12. Certainly, the action may alternatively be implemented by a modem processor 124 of the terminal device in FIG. 12 by controlling the transceiver 121.

In a possible design, the first reference time unit is a time unit in which the terminal device determines the second CWS. For example, if the terminal device determines the second CWS in a TTI, the first reference time unit is the TTI or a start time unit of the third uplink burst. For example, the start time unit may be a start time unit determined by the terminal device based on a time sequence relationship.

Optionally, the second reference time unit corresponding to the first uplink burst is a time unit in the first uplink burst; or the second reference time unit corresponding to the first uplink burst is a time unit that has an interval of a third time length from a start time unit of the first uplink burst, and the second reference time unit is after the start time unit of the first uplink burst; and the second reference time unit corresponding to the second uplink burst is a time unit in the second uplink burst; or the second reference time unit corresponding to the second uplink burst is a time unit that has an interval of a third time length from a start time unit of the second uplink burst, and the second reference time unit is after the start time unit of the first uplink burst.

Further, the second reference time unit corresponding to the first uplink burst may be different from the second reference time unit corresponding to the second uplink burst.

Optionally, the second reference time unit corresponding to the first uplink burst is the start time unit of the first uplink burst; or the second reference time unit corresponding to the second uplink burst is the start time unit of the second uplink burst.

Optionally, the first reference time unit is a time unit in which the terminal device determines the second CWS.

Optionally, the first reference time unit is a start time unit of the second uplink burst.

Optionally, the first CWS and the second CWS correspond to a same access priority.

Optionally, the LBT previous to the second LBT is the same as the first LBT.

Further, the second time length may be predefined or received from a network device.

Optionally, the third time length may be related to a delay of feeding back an HARQ status by the network device.

In the foregoing embodiments, on condition that the first reference time unit exceeds the first time threshold corresponding to the first uplink burst, that is, duration of the timer corresponding to the first uplink burst, and the first reference time unit also exceeds duration of the timer corresponding to the second uplink burst, and no HARQ status information is received after the first uplink burst, in other words, on condition that the terminal device exceeds timers corresponding to a plurality of uplink bursts and does not receive the HARQ status information, the terminal device increases the CWS only once, thereby avoiding excessive penalty on the CWS when there are a plurality of times of expiration, and improving properness of adjusting the CWS by the terminal device in an AUL scenario.

FIG. 12 is a possible schematic structural diagram of a terminal device. The terminal device can perform the method provided in the embodiments of the present invention. The terminal device may be any one of the two terminal devices 116 and 122 in FIG. 1. The terminal device includes a transceiver 121, an application processor (application processor) 122, a memory 123, and a modem processor (modem processor) 124.

The transceiver 121 may adjust (for example, perform analog conversion, filtering, amplification, and up-conversion on) output sampling and generate an uplink signal. The uplink signal is transmitted to the network device in the foregoing embodiment by using an antenna. In downlink, the antenna receives a downlink signal transmitted by a network device. The transceiver 121 may adjust (for example, perform filtering, down-conversion, and digitalization on) a signal received from the antenna and provide an input sample. The transceiver 121 may implement sending and receiving functions of the terminal device in the foregoing method embodiments, including the function of sending a data packet in an uplink burst. Technical features in the foregoing method embodiments are also applicable to the apparatus embodiment. Details are not described herein again.

The modem processor 124 is sometimes referred to as a controller or processor, and may include a baseband processor (baseband processor, BBP) (not shown). The baseband processor processes a received digitalized signal, to extract information or a data bit transmitted in the signal. Based on a requirement or an expectation, the BBP is usually implemented in one or more digits in the modem processor 124 or implemented as a separated integrated circuit (IC).

In a design, a modem processor (modem processor) 124 may include an encoder 1241, a modulator 1242, a decoder 1243, and a demodulator 1244. The encoder 1241 is configured to encode a to-be-sent signal. For example, the encoder 1241 may be configured to: receive service data and/or a signaling message that are/is to be sent in an uplink, and process (for example, format, encode, or interleave) the service data and the signaling message. The modulator 1242 is configured to modulate an output signal of the encoder 1241. For example, the modulator may perform processing such as symbol mapping and/or modulation on the output signal (data and/or signaling) of the encoder, and provide an output sample. The demodulator 1244 is configured to demodulate an input signal. For example, the demodulator 1244 processes an input sample and provides symbol estimation. The decoder 1243 is configured to decode a demodulated input signal. For example, the decoder 1243 performs processing such as de-interleaving and/or decoding on the demodulated input signal, and outputs a decoded signal (data and/or signaling). The encoder 1241, the modulator 1242, the demodulator 1244, and the decoder 1243 may be implemented by a combined modem processor 124. These units perform processing based on a radio access technology used in a radio access network.

The modem processor 124 receives, from an application processor 122, digitalized data that may represent voice, data, or control information, and processes the digitalized data for transmission. The modem processor may support one or more of a plurality of wireless communications protocols of a plurality of communications systems, for example, LTE, new radio, a universal mobile telecommunications system (Universal Mobile Telecommunications System, UMTS), and high speed packet access (High Speed Packet Access, HSPA). Optionally, the modem processor 124 may also include one or more memories.

Optionally, the modem processor 124 and the application processor 122 may be integrated in one processor chip.

The modem processor 124 may implement the processing function of the terminal device in the foregoing method embodiments, including determining a CWS and performing LBT, or the modem processor 124 may implement functions of sending a data packet and performing LBT together with the transceiver 121. The technical features in the foregoing method embodiments are also applicable to this apparatus embodiment. Details are not described herein again.

The memory 123 is configured to store program code (sometimes also referred to as a program, an instruction, software, or the like) and/or data that are/is used to support communication of the terminal device.

It should be noted that the memory 123 may include one or more storage units, for example, may be a storage unit that is inside the modem processor 124 or the application processor 122 and that is configured to store program code, or may be an external storage unit independent of the modem processor 124 or the application processor 122, or may be a component including a storage unit inside the modem processor 124 or the application processor 122 and an external storage unit independent of the modem processor 124 or the application processor 122.

The modem processor 124 may be a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, another integrated circuit, or any combination thereof. The modem processor 124 may implement or execute various example logical blocks, modules, and circuits described with reference to content disclosed in the embodiments of the present invention. The processor may also be a combination that implements a computing function device, for example, a combination including one or more microprocessors, a combination of a DSP and a microprocessor, or a system-on-a-chip (system-on-a-chip, SOC).

A person skilled in the art can understand that various explanatory logic blocks, modules, circuits, and algorithms described with reference to the various aspects disclosed in this application may be implemented as electronic hardware, an instruction that is stored in a memory or another computer readable medium and that is executed by a processor or another processing device, or a combination thereof. In an example, the device described in this specification may be applied to any circuit, hardware component, IC, or IC chip. The memory disclosed in this application may be any type of memory in any size, and may be configured to store any type of required information. To clearly explain such interchangeability, various explanatory components, blocks, modules, circuits, and steps have been generally described above based on functionality. How to implement such functionality depends on a specific application, a design selection, and/or a design constraint that is imposed on an entire system. A person skilled in the art may use different manners to implement the described functions for each particular application, but it should not be considered that such implementation goes beyond the scope of the present invention.

The modem processor 124 controls and manages an action of a terminal, and is configured to perform the action performed by the terminal device in the foregoing embodiment. The transceiver 121 is connected to the modem processor 124 and sends or receives a radio signal by using an antenna, where there may be a single antenna or a plurality of antennas. The memory 123 is configured to store data generated when the terminal device performs the method in the embodiments of the present invention and program code used to support communication of the terminal device.

An example of the present invention further provides an apparatus (for example, an integrated circuit, a wireless device, or a circuit module), configured to implement the foregoing method. An apparatus for implementing the method described in this specification may be a self-supporting device or a part of a larger device. The device may be: (i) an independent IC, (ii) a set of one or more ICs, where the set may include a memory IC configured to store data and/or instructions, (iii) an RFIC, such as an RF receiver or an RF transmitter/receiver, (iv) an ASIC, such as a mobile station modem, (v) a module that can be embedded in another device, (vi) a receiver, a cellular phone, a wireless device, or a mobile unit, or (vii) others.

The method and the apparatus that are provided in the embodiments of the present invention may be applied to a terminal device. The terminal device may include a hardware layer, an operating system layer running above the hardware layer, and an application layer running above the operating system layer. The hardware layer includes hardware such as a central processing unit (central processing unit, CPU), a memory management unit (memory management unit, MMU), and memory (also referred to as main memory). The operating system may be any one or more computer operating systems that implement service processing by using a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the method is not limited in the embodiments of the present invention, provided that a program that records code of the method in the embodiments of the present invention can be run to perform communication according to the method in this embodiment of the present invention. For example, the method in the embodiments of the present invention may be executed by a terminal device, or a functional module that can invoke a program and execute the program.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present invention.

In addition, aspects or features in the embodiments of the present invention may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a compact disc (compact disc, CD), a digital versatile disc (digital versatile disc, DVD), a smart card and a flash memory component (for example, erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

It should be understood that the description sequence of the foregoing processes does not mean an execution sequence in various embodiments in the embodiments of the present invention. The execution sequence of the processes should be determined based on functions and internal logic of the processes, and should not be construed as any limitation on the implementation processes of the embodiments of the present invention.

A person skilled in the art may clearly understand that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When the functions are implemented in the form of a software functional unit and sold or used as an independent product, the functions may be stored in a computer-readable storage medium. Based on such an understanding, the technical solutions of the embodiments of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention.

What is claimed is:

1. A method, comprising:
   performing first listen before talk (LBT);
   sending a first data packet on a first uplink burst after the first LBT succeeds;
   determining a second contention window size, wherein determining the second contention window size comprises at least one of following:
   on condition that a first reference time unit is after a first time duration starting from a second reference time unit corresponding to the first uplink burst and that first indication information indicating an hybrid automatic repeat request (HARQ) status is not received after the first uplink burst, determining the second contention window size by increasing a first contention window size; or on condition that a first reference time unit is within the first time duration starting from a second reference time unit corresponding to the first uplink burst and that the first indication information indicating the HARQ status is not received after the first uplink burst, determining the second contention window size by maintaining a first contention window size; and performing second LBT based on the second contention window size, wherein:

the first contention window size is used for a LBT previous to the second LBT, and the first reference time unit is later than the second reference time unit corresponding to the first uplink burst; and the first reference time unit is a time unit in which the second contention window size is determined, or the first reference time unit is a starting time unit of a second uplink burst corresponding to the second LBT; and the second reference time unit corresponding to the first uplink burst is a time unit in the first uplink burst.

2. The method according to claim 1, wherein the first indication information indicating the HARQ status is not received after the first uplink burst comprises:

the first indication information indicating the HARQ status is not received after the second reference time unit corresponding to the first uplink burst and before the first reference time unit.

3. The method according to claim 1, wherein:

the second reference time unit corresponding to the first uplink burst is a starting time unit of the first uplink burst; or the second reference time unit corresponding to the first uplink burst is a time unit that has an interval of a third time length from the starting time unit of the first uplink burst, and the second reference time unit is after the starting time unit of the first uplink burst.

4. The method according to claim 1, further comprising:

sending a second data packet on the second uplink burst when the second LBT succeeds, wherein the second uplink burst is later than the first uplink burst.

5. The method according to claim 1, wherein:

one time unit includes one or more slots; or one time unit includes one or more symbols.

6. The method according to claim 1, wherein:

the first reference time unit is a starting time unit of the second uplink burst, and that the first reference time unit is after the first time duration starting from the second reference time unit corresponding to the first uplink burst comprises: a starting position of the second uplink burst is after an ending position of the first time duration; or the first reference time unit is a starting time unit of the second uplink burst, and that the first reference time unit is within the first time duration starting from the second reference time unit corresponding to the first uplink burst comprises: a starting position of the second uplink burst is within the first time duration.

7. A wireless apparatus, comprising:

at least one processor; and one or more memories coupled to the at least one processor and storing program instructions for execution by the at least one processor to:

perform first listen before talk (LBT);

send a first data packet on a first uplink burst after the first LBT succeeds;

determine a second contention window size, wherein determining the second contention window size comprises at least one of following:

on condition that a first reference time unit is after a first time duration starting from a second reference time unit corresponding to the first uplink burst and that first indication information indicating an hybrid automatic repeat request (HARQ) status is not received after the first uplink burst, determining the second contention window size by increasing a first contention window size; or on condition that a first reference time unit is within the first time duration starting from a second reference time unit corresponding to the first uplink burst and that the first indication information indicating the HARQ status is not received after the first uplink burst, determining the second contention window size by maintaining a first contention window size to obtain the second contention window size; and perform second LBT based on the second contention window size, wherein:

the first contention window size is used for a LBT previous to the second LBT, and the first reference time unit is later than the second reference time unit corresponding to the first uplink burst; and the first reference time unit is a time unit in which the second contention window size is determined , or the first reference time unit is a starting time unit of a second uplink burst corresponding to the second LBT; and the second reference time unit corresponding to the first uplink burst is a time unit in the first uplink burst.

8. The wireless apparatus according to claim 7, wherein the first indication information indicating the HARQ status is not received after the first uplink burst comprises:

the first indication information indicating the HARQ status is not received after the second reference time unit corresponding to the first uplink burst and before the first reference time unit.

9. The wireless apparatus according to claim 7, wherein:

the second reference time unit corresponding to the first uplink burst is the start time unit of the first uplink burst; or the second reference time unit corresponding to the first uplink burst is a time unit that has an interval of a third time length from the starting time unit of the first uplink burst, and the second reference time unit is after the starting time unit of the first uplink burst.

10. The wireless apparatus according to claim 7, wherein the one or more store the program instructions for execution by the at least one processor to:

send a second data packet on the second uplink burst when the second LBT succeeds, wherein the second uplink burst is later than the first uplink burst.

11. The wireless apparatus according to claim 7, wherein the first contention window size and the second contention window size correspond to a same access priority.

12. The wireless apparatus according to claim 7, wherein:

the first reference time unit is a starting time unit of the second uplink burst, and that the first reference time unit is after the first time duration starting from the second reference time unit corresponding to the first uplink burst comprises: a starting position of the second uplink burst is after an ending position of the first time duration; or the first reference time unit is a starting time unit of the second uplink burst, and that the first reference time unit is within the first time duration starting from the second reference time unit corresponding to the first uplink burst comprises: a starting position of the second uplink burst is within the first time duration.

13. The wireless apparatus according to claim 7, wherein:
one time unit includes one or more slots; or
one time unit includes one or more symbols.

14. A non-transitory computer-readable medium storing computer executable instructions for execution by at least one processor to:
perform first listen before talk (LBT);
send a first data packet on a first uplink burst after the first LBT succeeds;
determine a second contention window size, wherein determining the second contention window size comprises at least one of following:
on condition that a first reference time unit is after a first time duration starting from a second reference time unit corresponding to the first uplink burst and that first indication information indicating an hybrid automatic repeat request (HARQ) status is not received after the first uplink burst, determining the second contention window size by increasing a first contention window size; or
on condition that a first reference time unit is within the first time duration starting from a second reference time unit corresponding to the first uplink burst and the first indication information indicating the HARQ status is not received after the first uplink burst, determining the second contention window size by maintaining a first contention window size; and
perform second LBT based on the second contention window size, wherein:
the first contention window size is used for a LBT previous to the second LBT, and the first reference time unit is later than the second reference time unit corresponding to the first uplink burst; and
the first reference time unit is a time unit in which the second contention window size is determined, or the first reference time unit is a starting time unit of a second uplink burst corresponding to the second LBT; and the second reference time unit corresponding to the first uplink burst is a time unit in the first uplink burst.

15. The non-transitory computer-readable medium according to claim 14, wherein the first indication information indicating the HARQ status is not received after the first uplink burst comprises:
the first indication information indicating the HARQ status is not received after the second reference time unit corresponding to the first uplink burst and before the first reference time unit.

16. The non-transitory computer-readable medium according to claim 14, wherein:
the second reference time unit corresponding to the first uplink burst is the start time unit of the first uplink burst; or
the second reference time unit corresponding to the first uplink burst is a time unit that has an interval of a third time length from the starting time unit of the first uplink burst, and the second reference time unit is after the starting time unit of the first uplink burst.

17. The non-transitory computer-readable medium according to claim 14, wherein the non-transitory computer-readable medium stores the computer executable instructions for execution by the at least one processor to:
send a second data packet on the second uplink burst when the second LBT succeeds, wherein the second uplink burst is later than the first uplink burst.

18. The non-transitory computer-readable medium according to claim 14, wherein the first contention window size and the second contention window size correspond to a same access priority.

19. The non-transitory computer-readable medium according to claim 14, wherein:
the first reference time unit is a starting time unit of the second uplink burst, and that the first reference time unit is after the first time duration starting from the second reference time unit corresponding to the first uplink burst comprises: a starting position of the second uplink burst is after an ending position of the first time duration; or the first reference time unit is a starting time unit of the second uplink burst, and that the first reference time unit is within the first time duration starting from the second reference time unit corresponding to the first uplink burst comprises: a starting position of the second uplink burst is within the first time duration.

20. The non-transitory computer-readable medium according to claim 14, wherein:
one time unit includes one or more slots; or
one time unit includes one or more symbols.

* * * * *

UNITED STATES PATENT AND TRADEMARK OFFICE
CERTIFICATE OF CORRECTION

PATENT NO. : 11,792,847 B2
APPLICATION NO. : 17/741114
DATED : October 17, 2023
INVENTOR(S) : Yuan Li and Lei Guan It is certified that error appears in the above-identified patent and that said Letters Patent is hereby corrected as shown below:

In the Claims

Column 34, Line 22-23, Claim 7, please delete "size to obtain the second contention window size;" and insert therefore -- size; --;

Column 34, Line 31, Claim 7, please delete "determined ," and insert therefore -- determined, --.

Signed and Sealed this
First Day of October, 2024

Katherine Kelly Vidal
*Director of the United States Patent and Trademark Office*